(12) United States Patent
Tal et al.

(10) Patent No.: US 11,939,069 B2
(45) Date of Patent: Mar. 26, 2024

(54) VERTIPORT WITH HANDLING ROBOTS AND A TURNTABLE

(71) Applicant: FLYON Aerosystems Ltd., Tel-Aviv (IL)

(72) Inventors: Oren Tal, Kfar-Sava (IL); Reuven Tal, Tel-Aviv (IL)

(73) Assignee: FLYON AEROSYSTEMS LTD., Tel-Aviv (IL)

( * ) Notice: Subject to any disclaimer, the term of this patent is extended or adjusted under 35 U.S.C. 154(b) by 0 days.

(21) Appl. No.: 18/237,012

(22) Filed: Aug. 23, 2023

(65) Prior Publication Data

US 2023/0391462 A1    Dec. 7, 2023

Related U.S. Application Data

(63) Continuation of application No. 18/114,346, filed on Feb. 27, 2023, now Pat. No. 11,745,884, which is a continuation of application No. 17/178,436, filed on Feb. 18, 2021, now Pat. No. 11,603,210, which is a continuation-in-part of application No. 16/664,913, filed on Oct. 27, 2019, now Pat. No. 11,565,801,
(Continued)

(51) Int. Cl.
| | |
|---|---|
| *B64D 27/24* | (2006.01) |
| *B64C 27/20* | (2023.01) |
| *B64F 1/22* | (2006.01) |
| *B64F 1/228* | (2024.01) |
| *B64F 1/24* | (2006.01) |
| *B64F 1/30* | (2006.01) |
| *B64F 1/36* | (2017.01) |

(52) U.S. Cl.
CPC .............. *B64D 27/24* (2013.01); *B64C 27/20* (2013.01); *B64F 1/228* (2013.01); *B64F 1/24* (2013.01); *B64F 1/30* (2013.01); *B64F 1/364* (2013.01)

(58) Field of Classification Search
CPC ...... B64F 1/24; B64F 1/30; B64F 1/31; B64F 1/228; B64F 1/222
See application file for complete search history.

(56) References Cited

U.S. PATENT DOCUMENTS

| | | | |
|---|---|---|---|
| 3,571,990 A * | 3/1971 | Rossman | ................... B64F 1/00 52/33 |
| 3,815,298 A * | 6/1974 | Pope | ....................... E04B 1/346 52/65 |

(Continued)

*Primary Examiner* — Joshua J Michener
*Assistant Examiner* — Cindi M Curry
(74) *Attorney, Agent, or Firm* — Rivka Friedman

(57) ABSTRACT

A transportation system and method serve passenger-conveying VTOL air vehicles (AVs) at a vertiport. The vertiport has a flight deck including at least one landing pad, a passenger terminal, and a dynamic partition arrangement that defines a capsule for receiving one of the AVs at a time. The dynamic partition arrangement assumes a first open state in which it is open to the flight deck and closed to the passenger terminal and a second open state in which it is closed to the flight deck and open to the passenger terminal. A robotic system includes a handling robot that automatically approaches and docks with the AV after landing, and conveys the AV between the landing pad and the capsule via an opening provided by the first open state of the dynamic partition.

4 Claims, 37 Drawing Sheets

Related U.S. Application Data which is a continuation-in-part of application No. PCT/IL2018/050468, filed on Apr. 29, 2018.

(60) Provisional application No. 62/572,493, filed on Oct. 15, 2017, provisional application No. 62/502,793, filed on May 8, 2017, provisional application No. 62/490,622, filed on Apr. 27, 2017.

(56) References Cited

U.S. PATENT DOCUMENTS

| | | | | |
|---|---|---|---|---|
| 4,319,722 | A | * 3/1982 | Pesando | B64F 1/125 244/116 |
| 4,834,321 | A | * 5/1989 | Granger | B64F 1/125 410/12 |
| 5,988,564 | A | * 11/1999 | Lee | B64F 1/24 244/116 |
| 2003/0145760 | A1 | * 8/2003 | Hadley | E04H 6/44 105/28 |
| 2015/0367960 | A1 | * 12/2015 | Dyanzio | B64F 1/228 701/28 |
| 2020/0010216 | A1 | * 1/2020 | Devaux | B64F 1/00 |

\* cited by examiner

22

24   22

24   22   18

20

VERTIPORT WITH HANDLING ROBOTS AND A TURNTABLE

FIELD AND BACKGROUND OF THE INVENTION

The present invention relates to Aerial Vehicles (to be hereinafter referred to as AV), and in particular VTOL (Vertical Take-Off and Landing) aircraft and corresponding methods of operation of dedicated transportation stations for such aircrafts enabling vertical take-off and landing, commonly referred to as Vertiports. In many cases, in particular urban areas, there are limitations on the size of the Vertiports, stemming from real estate scarcity. The present invention relates to various features which facilitate a high traffic-rate aerial transportation system with a low-footprint Vertiport.

In view of heavy traffic congestion in many urban areas, a major effort is being conducted worldwide to develop solutions that will enable by-passing the ground traffic congestions. In many cases these solutions are based on VTOL aircrafts, mostly with electric motors with electronic control.

SUMMARY OF THE INVENTION

The present invention is a transportation system and corresponding methods for operation of a vertiport.

According to the teachings of an embodiment of the present invention there is provided, a transportation system comprising: (a) a plurality of passenger-conveying VTOL air vehicles (AVs); (b) a vertiport comprising: (i) a flight deck including at least one landing pad, (ii) a passenger terminal, and (iii) a dynamic partition arrangement defining a capsule for receiving one of the AVs at a time, the dynamic partition arrangement assuming a first open state in which the capsule is open to the flight deck and closed to the passenger terminal and a second open state in which the capsule is closed to the flight deck and open to the passenger terminal; and (c) a robotic system comprising at least one handling robot configured for automatically approaching and docking with the AV while not in flight, wherein the at least one handling robot is operative to convey the AV between the landing pad and the capsule via an opening provided by the dynamic partition assuming the first open state.

According to a further feature of an embodiment of the present invention, the vertiport further comprises a parking area for the AVs, and wherein the dynamic partition is further configured to selectively provide a parking area access opening, the at least one handling robot being further operative to convey the AV between the capsule and the parking area via the parking area access opening.

According to a further feature of an embodiment of the present invention, the AV has a maximum horizontal dimension, and wherein the parking area has a plurality of parking locations, a center of at least one of the parking locations being within three times the maximum horizontal dimension from the dynamic partition that defines the capsule.

According to a further feature of an embodiment of the present invention, the dynamic partition is further configured to provide access for energy provisioning to the AV within the capsule.

According to a further feature of an embodiment of the present invention, each of the AVs is powered by at least one swappable energy store, and wherein the vertiport further comprises an energy store handling area, the at least one handling robot or an additional robotic subsystem of the robotic system being operative to convey a depleted energy store from the AV to the energy store handling area and a non-depleted energy store from the energy store handling area to the AV.

According to a further feature of an embodiment of the present invention, the at least one handling robot or the additional robotic subsystem is configured to remove a depleted energy store from the AV.

According to a further feature of an embodiment of the present invention, the at least one handling robot or an additional robotic subsystem of the robotic system is configured to attach a non-depleted energy store to the AV.

According to a further feature of an embodiment of the present invention, the landing pad comprises a turntable or other rotation device for aligning the AV with a direction of approach of the handling robot.

According to a further feature of an embodiment of the present invention, the capsule comprises a turntable or other rotation device for reorienting the AV and/or the handling robot.

According to a further feature of an embodiment of the present invention, the handling robot comprises at least one lifting actuator selectively deployable to lift the AV.

According to a further feature of an embodiment of the present invention, there is also provided a vertiport controller comprising at least one processor and a communications subsystem, the vertiport controller being in communication with the dynamic partition arrangement and with the robotic system, the vertiport controller being configured to be responsive to landing of one of the AVs on the landing pad to: (a) deploy the handling robot to approach and dock with the AV on the landing pad, and to convey the AV from the landing pad to the capsule via an opening provided by the dynamic partition assuming the first open state; (b) actuate the dynamic partition to switch to the second open state for disembarking of at least one passenger; and (c) actuate the robotic system to perform an energy provisioning cycle to the AV to prepare the AV for subsequent flight.

According to a further feature of an embodiment of the present invention, the energy provisioning cycle is performed by swapping a depleted energy store with a non-depleted energy store.

According to a further feature of an embodiment of the present invention, the energy store is a rechargeable battery.

According to a further feature of an embodiment of the present invention, the energy store is a fuel cell.

According to a further feature of an embodiment of the present invention, the vertiport controller is further configured to return the dynamic partition arrangement to a closed state in which the capsule is closed to both the flight deck and to the passenger terminal.

There is also provided according to the teachings of an embodiment of the present invention, a method of operating a vertiport comprising: a flight deck including at least one landing pad, a passenger terminal, and a partition arrangement defining a capsule selectively openable to the flight deck while closed to the passenger terminal and selectively openable to the passenger terminal while closed to the flight deck, to handle arrival and departure of a passenger-conveying VTOL air vehicle (AV) to and from the vertiport, the method comprising the steps of: (a) actuating a handling robot to automatically approach and dock with the AV after landing on the landing pad; (b) actuating the handling robot to convey the AV from the landing pad to the capsule, the partition arrangement being opened to the flight deck while being closed to the passenger terminal to allow entry of the AV into the capsule; (c) closing the capsule to the flight deck and opening the capsule to the passenger terminal to allow disembarking and/or embarking of at least one passenger from or to the AV; and (d) actuating the handling robot to convey the AV from the capsule to the landing pad for take-off, the partition arrangement being opened to the flight deck while being closed to the passenger terminal to allow exit of the AV from the capsule.

According to a further feature of an embodiment of the present invention, the vertiport further comprises a parking area for the AVs, the method further comprising actuating the handling robot to convey the AV from the capsule to the parking area via a selectively openable opening in the partition arrangement.

According to a further feature of an embodiment of the present invention, while the AV is within the capsule: (a) a depleted energy store is robotically detached from the AV; and (b) a non-depleted energy store is robotically attached to the AV.

According to a further feature of an embodiment of the present invention, the vertiport further comprises an energy store handling area, the method further comprising robotically conveying the depleted energy store, after the detaching, from the capsule to the energy store handling area and robotically conveying the non-depleted energy store from the energy store handling area to the capsule, for the attaching.

According to a further feature of an embodiment of the present invention, prior to docking of the handling robot with the AV, the AV is rotated on the landing pad so as to align the AV with a direction of approach of the handling robot.

According to a further feature of an embodiment of the present invention, the AV and/or the handling robot are rotated by use of a turntable or other rotation device within the capsule.

According to a further feature of an embodiment of the present invention, docking of the handling robot with the AV includes deploying at least one lifting actuator to lift the AV.

General Design Considerations

Preferably, the transportation system based on urban transportation AV's is to be run by an operating company that provides AV's, Vertiports and other necessary supportive systems. In dense urban areas, it is of special importance for a Vertiport to be easily accessible to passengers in town. The location of the Vertiport in town must take into account the scarcity and cost of real estate resources. Therefore, Vertiport area (which is also referred to as "footprint") should be particularly minimized so it can be located on rooftops of standard urban buildings.

Furthermore, it is of importance that an AV is readily available once a passenger arrives at a Vertiport, without an undue waiting time. To that end, a high traffic throughput capability (preferably capable of a take-off roughly once per 1-2 minutes) is desired. To satisfy such requirements, a plurality of AV's, preferably at least 5-10 at a time, must be accommodated at the Vertiport, ready to serve departing passengers, regardless of whether there are incoming flights or not. Also, the process of passenger embarkation at the Vertiport terminal and conveyance to the take-off pad must be streamlined. Finally, energy must be provisioned to a departing AV, prior to passenger embarkation. Further to having the required number of AV's available to meet traffic demands, a key enabler to high traffic throughput is handling the AV at the rooftop by robotic systems (such as robotic carts) for conveying and energy provisioning purposes. An AV design may feature integral or detachable (swappable) energy stores. The most wide-spread energy stores are batteries, though other types, such as fuel cells may be alternatively provided. In the subsequent text, for the sake of simplicity, reference may be made interchangeably to batteries as the representative energy store and battery swapping or battery charging as the representative energy store swapping or energy store replenishing, respectively, with the understanding that the teachings are of relevance for other types of energy stores, such as for example, fuel cells, as well. It is also understood that battery swapping means replacement of a depleted battery with a charged battery, wherein the charging process is conducted off-line at a battery charging zone including a battery outlet, the battery outlet receiving depleted batteries and providing recharged batteries. Energy provisioning to AV by robotic carts may be preferably conducted by battery swapping. For that end, the robotic cart (as an energy provisioning intermediary) is preferably provided with the battery to be transferred to the AV by a robotic device at the Vertiport Battery Outlet, most preferably with a task time of no more than about 1-2 minutes. The batteries themselves may be charged at the Battery Charging Zone in an off-line process. Alternatively, if the AV design features an integral battery, the robotic cart may convey and connect the AV to a charging outlet. In this case charging is an on-line process (i.e., associated with the AV at the Vertiport), which is more lengthy (30-60 minutes according to current technology). The big downside of such design is that during this time the AV is idle at the Vertiport, occupying space resources and unable to conduct flight missions. While evolving technology of fast-charging may reduce battery charging time in the future, such time-saving may be at the expense of (a) reduced battery lifetime, as charging of an AV integral battery cannot be performed at the controlled conditions (such as temperature) existing at dedicated battery charging facilities and (b) reduced energy density and power density characteristics as compared to preferable characteristics achievable by an optimized charging procedure, which is more lengthy yet feasible in an off-line process at the Battery Charging Zone.

A preferred way for autonomously conveying the AV between areas of a Vertiport is by a robotic cart configured for autonomously approaching and entering beneath the AV after the AV has landed at the landing area and then engage the AV, including autonomous repositioning, navigation, alignment and docking with the AV. Such robotic cart will be hereinafter referred to as "cart". It is to be understood that the cart is an autonomous vehicle and may be equipped with various systems such as power supply (preferably swappable electric batteries), navigation, steering, actuators for lifting the AV, control system.

According to certain particularly preferred aspects of the present invention, there are three principal functional cycles at the Vertiport:

Passenger traffic cycle—AV landing, AV docking with robotic cart, conveying from landing pad to disembarkation area, passenger disembarkation, passenger embarkation, conveying from embarkation area to take-off pad, undocking from robotic cart, taking off.

Energy provisioning cycle—this cycle takes place after incoming passenger disembarkation and before outgoing passengers embarkation. A robotic cart detaches discharged energy store from AV, undocks from AV with depleted energy store and proceeds to energy bank delivering depleted energy store to energy bank, receives replenished energy store from energy bank and proceeds to an AV at embarkation zone, docks with AV, and attaches an energy store to the AV. Loosely coupled to the energy provisioning cycle there is an inner cycle at the energy bank (such as Battery charging Zone) A depleted battery is brought in by a robotic cart from the disembarkation zone to the Battery Outlet, is charged under appropriate conditions during a lengthy period (typically between minutes) and thereafter the replenished battery is picked up by another robotic cart from the Battery Outlet onto the embarkation zone. As the number of batteries being charged at any moment in time is considerably larger than the number of AV's to be provisioned with replenished batteries, the charging time of the batteries can be much larger than the time between consecutive swapping operations.

AV Parking cycle—according to traffic demands, robotic carts or AV's docked with robotic carts, move from embarkation/disembarkation location to Parking/Maintenance Zone or vice versa.

It is to be noted that the passenger transporting cycle is the "driving" cycle of the Vertiport operating scheme, since it is the cycle determining the Vertiport performance in terms of throughput and availability. The energy provisioning cycle and the parking cycle are "compliant" cycles with the purpose of supporting steady flow of the passenger traffic cycle.

It will be noted that bringing the AVs sequentially to predefined locations for disembarkation and embarkation areas adjacent to Passenger Terminal gates provides notable logistical and safety advantages compared to Vertiport designs requiring the passengers to approach the take-off area and/or disembark right at the landing area.

The design as taught by the current invention enables a convenient, safe, compact, and highly area-efficient rooftop site with a high traffic throughput including Parking/Maintenance and Battery Recharging Zones, thus ensuring sufficient availability of AVs at time of peak demand. Moreover, since a site of this type typically requires merely minor infrastructure modifications to existing rooftops, it is relatively straightforward to retrofit it at existing buildings, which is obviously crucial for its fast proliferation. In case of new buildings in urban areas, the present design does not necessitate extra real-estate resources, as it fits onto the dimension of regular urban buildings. It should be noted that the AV handling by the robotic cart can greatly streamline the smooth operation of any terminal (rooftop or other).

It is to be emphasized that the concept of using robotic carts for conveying the AV throughout the functional cycle is in many aspects advantageous compared to using a conveyor belt. Although conveyor belts are widely used to facilitate motion in a flowing system such as pedestrian passengers at airports, there are serious drawbacks to applying the method for moving the AV as part of the Vertiport functional cycle, most of which are avoided when using robotic carts, as will be hereinafter described.

For conveyor belts substantial embedded infrastructure is required, which must be taken into consideration in the building construction plans (structural supports, etc.). This inevitably drives up the construction cost of the vertiport. Also, this may hamper retrofitting Vertiports on existing buildings. In contrast, robotic carts, do not require any special infrastructure considerations. Moreover, the typical cost of a dozen of robotic carts per vertiport is estimated to be by far lower than any conveyor construction cost.

Any malfunction in the conveyor belt essentially propagates upstream and may delay subsequent landings due to the jam-up. In contrast, a malfunctioning cart may be taken aside for off-line maintenance without stopping the functional cycle.

At several stations throughout the functional cycle the AV's must be held in place for several tens of seconds—namely the embarkation and disembarkation station and the energy store swapping station. When employing a conveyor belt as a means of conveyance, there exist two options for halting the AV's at each station: (a) Stopping the movement of the conveyor belt. This inevitably creates an undesired coupling between the different stations connected by the same belt which results in a highly sub-optimal performance of the functional cycle. (b) Placing the AV on and off the conveyor belt at each station so as not to interrupt the conveyor belt flow. . . . This requires employing considerable mechanical means at each station, entailing more construction and maintenance costs. Simply stated, this is a "last yard" problem, inherently solved by the robotic cart.

We furthermore expand on the design and functionality, both at air-vehicle and ground systems level, to best explain additional aspects of the invention. As already explained, the automated design is a key enabler of certain aspects of the invention for streamlining the passenger travel process and enabling a high traffic throughput.

For making the system accessible and available to the public it is desirable that Vertiports be widespread throughout the urban area. As real estate is expensive in urban areas, Vertiports need to be compact ("low footprint") in terms of utilized area. Under such circumstances, it is highly advantageous to maximize the ratio between the passenger traffic rate and the Vertiport area. This can be best achieved by both streamlining the Vertiport traffic cycle to minimize the intervals between consecutive take-offs and by compactness of the various elements of the system and the Vertiport itself. The high traffic rate is one of the key parameters in making the fare prices affordable to the public.

Minimizing intervals between landing of an AV with arriving passengers and its subsequent takeoff with departing passengers, results in reducing idle time. The outcome is a more efficient utilization of the AV and thereby minimization of the size of the air fleet needed to meet the overall travel demand.

The transportation cycle design and the corresponding Vertiport must accommodate, at any given time, incoming and outgoing travel at various levels of demands during various daily, weekly and even seasonal periods. Whenever the incoming and outgoing travel demands are similar, the traffic is defined as balanced. An efficient design of the traffic process, from landing to take-off, including conveyance, passenger disembarkation/embarkation and energy provisioning is necessary for maximizing balanced traffic rate, to be hereinafter also referred as traffic throughput, generally expressed as passengers/hour. Maximizing traffic throughput may be facilitated by extensive utilization of robotic systems.

In case of inequality between incoming and outgoing traffic demand, there is imbalanced traffic. This is particularly the case for the traffic of passengers commuting between suburban and downtown areas. Traffic imbalance necessitates a buffer zone at the Vertiport to accommodate AVs which are stand-by for a while as well as for off-service hours parking. Most essentially, one must make sure that a scheduled incoming flight will have an available landing pad at the scheduled time and for that end, if there is no travel demand for the previously landed AV, it must be moved to the Parking Zone. Accordingly, a dedicated Parking Zone is to be maintained at the Vertiport, which may also serve for some maintenance activities.

The number of vehicles in the buffer zone, as well as the overall stowing configuration are key factors which influence the size of the Parking Zone. The compactness of the Parking Zone is a key factor in the compactness of the entire Vertiport. The compactness of the Vertiport has also a major impact on the timeline of retrieving stand-by vehicles from the buffer and thereby on the cycle time at traffic imbalance periods. The retrieval time of an AV from the parking zone for meeting departing flight travel demand at time when there is momentarily no incoming flight, must be commensurate with the overall traffic cycle. Robotic systems may assist in minimizing retrieval time.

After an AV lands at the landing pad on the Vertiport flight deck, the AV with the passengers seated therein needs to be conveyed safely and in minimum time onto the disembarkation area adjacent to the passenger terminal gate. Such operation is advantageously conducted fully automatically by robotic systems. The compactness of the Vertiport in terms of distance between landing pad and Passenger Terminal has a major impact on the timeline of the traffic cycle as well as on the overall travel time of the passengers.

Energy provisioning to the AV at the Vertiport must be conducted at a rate which is compatible with the traffic cycle. The preferred method to achieve this is by swapping of energy stores (such as batteries of fuel cells), i.e., removing depleted energy stores and replacing them by replenished energy stores. Energy store swapping, such as battery swapping, enables much faster energy provisioning (typically 1-2 minutes) as compared to battery charging (typically 30-60 minutes for a full charge) and obviates lining up of AV's at the Vertiport for the charging process. All such operations are to be conducted automatically by robotic carts docking with the AV or with the energy store outlet (such as Battery Outlet). For the sake of textual simplicity, we may further refer to batteries as an exemplary energy store. The teachings of the invention will however apply to other types of energy stores as well. Replenishing energy stores (e.g., batteries charging) is a lengthy process (several tens of minutes as compared to the transportation cycle time of a few minutes) and is therefore to be conducted offline at a dedicated location such as the Battery Charging Zone at which multiple battery systems are being charged in parallel operation in order to be able to supply the demand as dictated by the traffic cycle. The robotic carts transfer the batteries to-and-fro the AV and the battery outlet at the Battery Charging Zone through an appropriate path.

The compactness of the Vertiport has also a major impact on the distance between the AV battery swapping location and the battery outlet. Such distance directly affects the battery conveyance time and thereby the energy provisioning time and the entire transportation cycle time. There is a further big advantage of battery swapping: decoupling between the battery charging process and the AV functional process enables conducting the charging process at the Battery Charging Zone under controlled conditions at a rate optimal for battery charging and independent of the traffic cycle. This obviously involves parallel recharging of a large number of batteries, but the dimensions of the batteries are much smaller the AV dimensions and batteries may also be vertically stacked during charging. To summarize this point, the big upside of the battery swapping method relative to recharging an integral battery is obviating the burden of multitude of idle AVs grounded at the terminal, utilizing expensive space during a lengthy charging process.

Robotic carts may also facilitate stowing operations at the Parking Zone to maximize parking capability for a given area.

All robotic operations mentioned are instrumental in reducing transportation cycle time and operation cost, as well as obviating the exposure of human operators to related hazards.

Passenger safety and comfort are a major concern in every transportation system. Such concern applies at Vertiports located on rooftops in which there may be harsh environmental conditions (temperature, humidity, wind, rain, ice, solar radiation) as well as possible hazards due to the operation of autonomous robotic systems, AV rotors and battery charging facilities. The Vertiport design, as to be outlined in the embodiments of the invention, is oriented at maximum passenger safety and comfort by isolating the passengers from hazards and preferably from environmental conditions, as well as at achieving minimum cycle time. Most preferably, all embarkation and disembarkation operations are conducted in a confined and protected space, which keeps the passengers isolated from the hazards and conditions as mentioned.

The air-transportation industry standard for safe and comfortable aircraft boarding is the passenger boarding bridge (PBB) also known as jet bridge. Jet bridges provide all-weather dry access to aircraft and enhance the security of terminal operations. They are often permanently attached at one end to the terminal building and have the ability to bridge between the terminal and aircraft of different sizes. The passenger boarding capsule (PBC), referred to herein for the sake of brevity as the "capsule," as taught by the present invention is a superior alternative to a PBB for providing all passengers, in particular those with various types of disabilities and mobility impairments, safety and comfort during boarding while also possibly supporting other functions such as aircraft parking and energy provisioning.

It is highly desirable that during embarkation, embarking passengers are isolated from the flight deck by a movable shield such as a door. This shield must be later removed to allow the AV to proceed to the flight deck. At this time, passengers and personnel at the terminal need to be protected from the flight deck environment. This requires a further movable shield between the passenger terminal and the boarding station. These two types of shields must be operated interchangeably at the boarding station to make sure that at any time, at least one of them is closed. This type of arrangement will be hereinafter defined as a dynamic partition arrangement. The term "partition arrangement" is used herein to refer to any and all partition structure which extends from floor to ceiling/roof to provide a barrier to undesired environmental conditions. The partition arrangement is preferably a "dynamic partition arrangement" which opens and closes as required, typically either by use of "door" structures opening in any direction (e.g., horizontally sliding or vertically raised/lowered shutters) or displaceable wall sections with variable overlap/opening, all as will be exemplified below. The dynamic partition may include active elements in and/or under the floor of the capsule.

This partition arrangement is also highly advantageous for access denial of unauthorized people from the terminal to the flight deck.

For all the reasons detailed above, a dynamic partition arrangement of this sort is desirable at any vertiport configuration. However, for the vertiport subject of the present invention whose major drivers are high area utilization and high traffic volumes, the arrangement is especially important for the following reasons:

(a) For time and area considerations the boarding stations are preferably located in close vicinity to the landing pads. This underscores the necessity for enhanced environmental isolation and access denial.

(b) For area utilization, it is in many cases desirable that a single landing pad serves a plurality of boarding stations. It is highly desirable that when two boarding stations are sharing the same landing pad, passengers embarking in the first boarding station are isolated from the shared pad when an AV lands to be served at the second boarding station.

The particular implementation of dynamic partition arrangement, to be hereinafter described, serves to define a "capsule" and is a focal point of certain particularly preferred implementations of the present invention. The capsule is most preferably circular, but may alternatively be implemented in other shapes, such as a regular or irregular polygon. The capsule is preferably close fitting relative to the AV footprint (for example, preferably having an internal diameter no more than about twice the maximum horizontal dimension of the AV), for a space-efficient implementation of the vertiport.

The AV design has a definite impact on the overall system design. For urban transportation, a pure multicopter design with each rotor driven by an electric motor is of preference relative to e.g., tiltable rotor designs, because of flight reliability and safety consideration (i.e., without changing the aeronautical configuration during flight and having the aircraft ready for vertical landing at any time). A pure multicopter with a multitude of rotors (at least 8) can be designed with multiple redundancies, thus enabling safe landing even if one or two motors malfunction. A pure multicopter has in general more compact dimensions compared to tiltable rotor designs (e.g., by Joby Aviation and Lilium) and thus more convenient for operation by compact Vertiports. The emergence of disruptive battery technology, enhances the ability of the pure-copter design to fulfill the flight range and flight time requirements for Urban Air Mobility.

BRIEF DESCRIPTION OF THE DRAWINGS

The invention is herein described, by way of example only, with reference to the accompanying drawings, wherein.

DESCRIPTION OF THE PREFERRED EMBODIMENTS

The principles and operation of transportation systems and corresponding methods according to the present invention may be better understood with reference to the drawings and the accompanying description.

Embodiment A

According to a first embodiment of the invention, the inventive transportation system typically includes the following elements and modules.

(1) A Plurality of AV's

A plurality of AVs, preferably of "pure-copter" multicopter design each comprising: (i) a passenger cabin for receiving at least one passenger, and (ii) a propulsion system comprising a plurality of propulsion units, the propulsion system being configured to propel the AV for powered flight and to perform vertical take-off and landing (VTOL). A multicopter featuring at least 8 rotors may be more reliable than a helicopter with one main rotor and in case of electric or hybrid design would feature several smaller motors rather than one large motor.

A "pure-copter" multicopter is hereby defined as a multicopter with all rotors having a fixed axis of rotation essentially perpendicular to the AV floor. Other types of multicopter are, e.g, tiltwing multicopters (https://en.wikipedia.org/wiki/Tiltwing), tiltrotor multicopters (https://en.wikipedia.org/wiki/Tiltrotor), and "lift-and cruise" multicopters having one set of rotors fixed essentially perpendicular to the AV floor and a second set of rotors essentially parallel to AV's longitudinal axis.

The system of the present invention may operate with a fleet of generally similar AVs. Additionally, or alternatively, the vertiport described below can receive and service a range of different AVs, so long as they are provided with a set of standardized parameters that are compatible with the vertiport systems. These include: a compatible overall footprint and weight category; a standardized docking interface; and a standardized energy store interface. These latter requirements will be clearer in view of the description of the vertiport operation further detailed below.

Figure 1A:
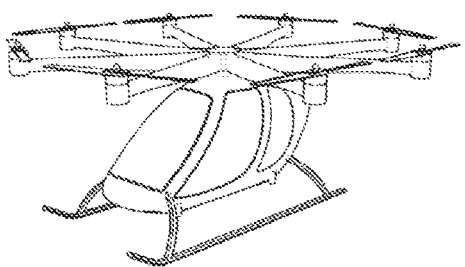
FIGS. 1a-1f present views of the AV from various directions.
Figure 1B:
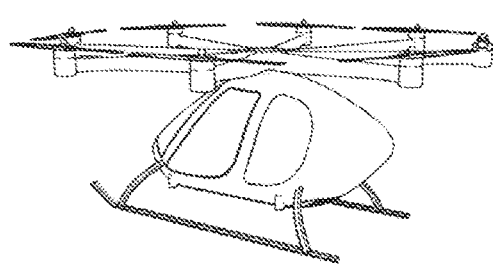
Figure 1C:
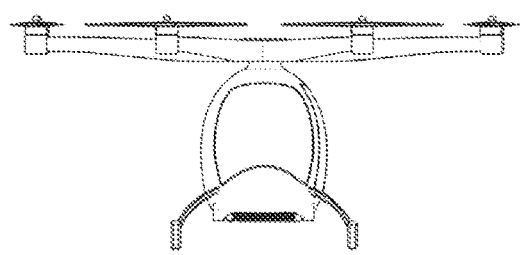
Figure 1D:
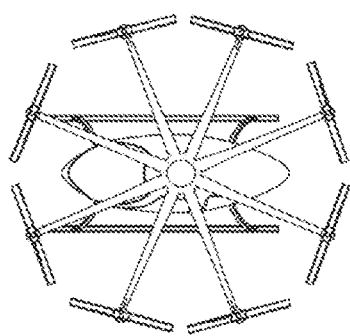
Figure 1E:
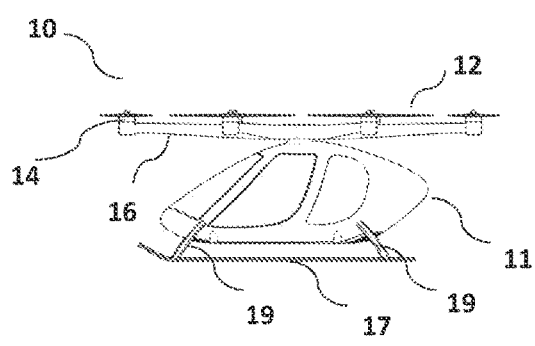
Figure 1F:
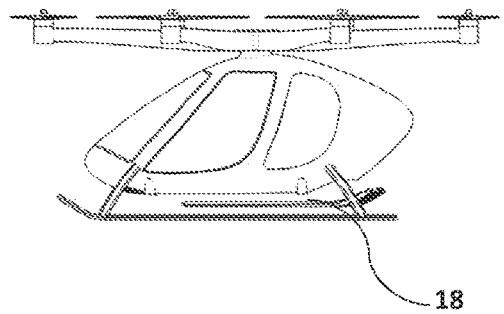

FIGS. 1a-1e describe in front perspective, aft perspective, front, top, side views respectively an exemplary AV 10. FIG. 1f illustrates in a side view the AV with battery system detached. FIGS. 1a-f depict the AV 10 with a propulsive assembly including eight rotors 12 driven by eight motors 14 supported by eight supportive arms 16, the supportive arms being structurally integrated to body main structure 11, which may be hereinafter referred to as fuselage or cabin. Skids 17 supporting the AV are connected to the body main structure by skid supporters 19.

It should be noted that many other designs are possible, including a design with a single rotor at each arm as well as options employing at least four arms, each of them supporting at least one propulsive unit including a rotor coupled to a driving motor. The arms may be structurally interconnected. Typically, the AV may carry one or two passengers. The AV take-off/landing may be done using an originally ground-dedicated take-off/landing system based on skids, legs or other landing gears attached to the fuselage of the AV. A single propulsive unit or a pair of independently driven propulsive units supported coaxially by each arm, typically operated as a single effective propulsive unit may be supported by each arm.

An important consideration in the design of the electrical system of an AV is providing maximum redundancy. This may be achieved by dividing the propulsive units into several groups, e.g., in cases of eight propulsive units dividing them into two sets of four units, respectively and implementing a separate power supply system for each set. A galvanic separation of the power supply to the two groups ensures that an electric failure at one electrical system does not propagate to the other, so that at least four propulsive units, respectively will remain operational. In a preferred embodiment, each set of four propulsive units, respectively can generate separately, at least for a short period of time, the lift required for the AV to arrive to a landing site safely. Another redundancy option is supplying the power separately to each pair of diagonally opposite propulsive units, wherein in case of an electric failure in one of the pairs, the other pairs would be unaffected and thus a total of six propulsive units would remain operational.

Most preferably, the multicopter design with rotors rotating in planes above cabin roof level, being void of the functional and safety limitations which may apply for a design with rotors rotating in planes below cabin roof level, as detailed for example in US Patent Application 20200055594. A further advantage of the rotors rotating above cabin level, compared to rotors rotating at a level close to the ground is that the former design features a much lower noise level at take-off and landing. The AV may be provided with a propulsion system comprising a plurality of propulsion units. The AVs are provided with attaching (or docking or engaging) interfaces with various robotic systems at the Vertiport such as robotic carts for heaving, conveying, battery swapping, and parking. One of the key features of the AV design is the functional and structural adaptation of swappable battery system(s). A preferable design of the AV features the battery system 18 located at the AV belly, facilitating access to robotic swapping from beneath. Notwithstanding the battery swapping design, the design may also include provisions to enable battery charging of the AV without removal of the batteries.

The multicopter includes a passenger cabin accommodating at least one passenger, a plurality of propulsive units (for example, rotors and motors coupled to them), flight systems such as guidance, navigation and control, flight data displays, communication systems, power supply (such as batteries, fuel cells, hydrogen, or hybrid systems), a multicopter structure supporting and connecting the various elements and subsystems of the multicopter, including landing elements such as skids or legs. Except as further specified below, features of the propulsive units, the flight systems, and many other features of the multicopter are closely analogous to known and commercially available subsystems of existing multicopters, and will be fully understood by a person having ordinary skill in the art. For conciseness of presentation, in the subsequent description, the multicopter will be presented in a schematic manner, with emphasis only on those features which distinguish the multicopter of the present invention from the known art and omitting explicit description of various conventional features and components.

The propulsion system is configured to propel the AV for powered flight including vertical take-off and landing (VTOL). The propulsive units may be structurally supported by arms which are connected to the main multicopter structure. In certain design options, the supportive arms of the propulsive systems may be structurally interconnected and/or connected to the cabin roof structure in order to optimize overall structural characteristics.

For flight, take-off/landing and ground safety reasons, it is preferred that the rotors be located above the cabin roof level.

The AV battery, whether preferably swappable or otherwise integral, is located at the belly of the AV fuselage. This design approach entails the following advantages:

(a) Low location of center of gravity of stand-alone AV. This is an important attribute effecting flight stability and safety in normal flight, and even more so in case of malfunction of any of the propulsion units.

(b) Low location of center of gravity of AV docked with conveying robotic cart. This is an important attribute effecting driving stability, in particular in windy environments such as on rooftops.

(c) Enables geometric configuration featuring large horizontal surface and small thickness, as implemented in electric car designs. This configuration enjoys a high surface-to-volume ratio which is highly desirable for heat dissipation. There is no other place in the AV to position a battery of such size.

(d) Enabling enhanced battery cooling by convective heat transfer by nearby air-flow while in flight (e) Enabling enhanced cooling when on ground by e.g., by an air blower or other mechanism. This is especially important for non-removable battery configurations.

(f) Adopting a battery package with a form-factor and geometry similar to electric car battery package designs will enable usage of existing battery manufacturing infrastructure (e.g., Tesla Gigafactories, https://www.tesla.com/gigafactory) and thereby reducing R&D as well as manufacturing costs.

It should be noted that, for clarity of presentation herein, details of the AV controller and various other components of the AV are not shown here in detail. In each embodiment of the present invention, the AV is preferably provided with various sensors (GPS receivers, image sensors, range sensors, orientation and motion sensors), processors, communications systems and all other components commonly used to implement autonomous drones with autonomous navigation capabilities using GPS and/or optical tracking, collision avoidance and automated take-off and landing. All such components, subsystems and modes of operation are well-known in the art of manufacture of air vehicles, and will be readily understood by one having ordinary skill in the art.

For sake of completeness and clarity, it is to be noted that there exist different configurations of AV's with tiltable rotors which feature mechanical and aerodynamic transitions during flight. These AV's typically suffer from considerable complexities and hazards in aspects such as flight control and structural integrity throughout the transition. Nevertheless, teachings of present invention are applicable for AV's with tiltable rotors as well.

Figure 2A:
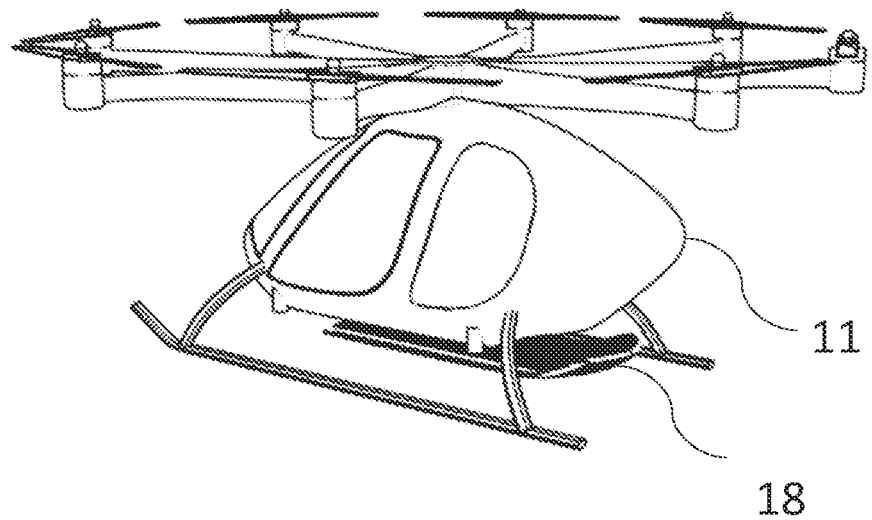
FIGS. 2a-2b present views of the AV with battery system apart from various directions.
Figure 2B:
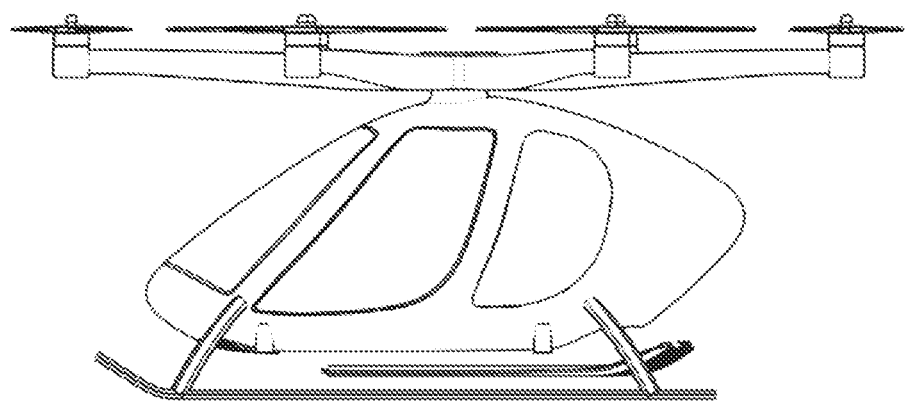
Figure 3A:
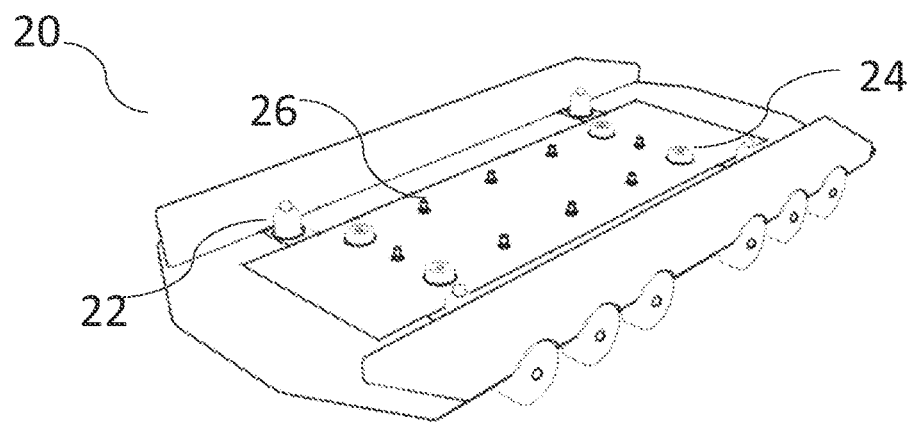
FIGS. 3a-3d present views of the robotic cart from various directions.
Figure 3B:
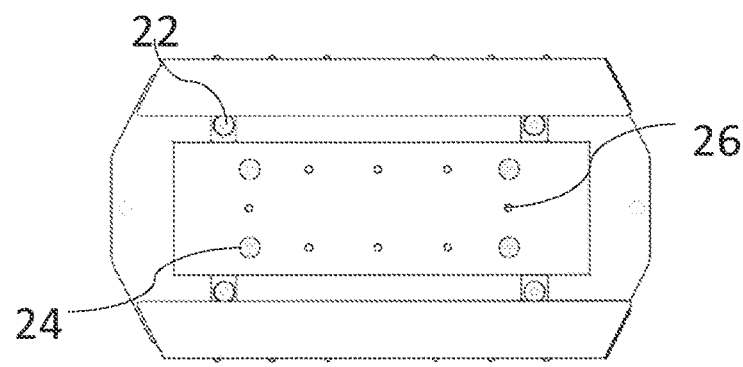
Figure 3C:
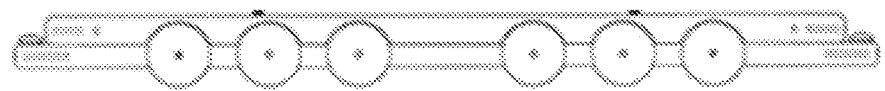
Figure 3D:
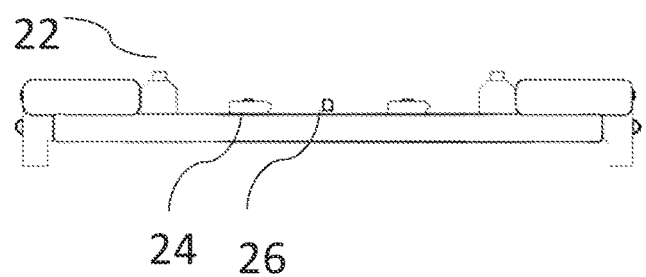

FIGS. 2a-2b depict in aft perspective and side view an AV 10 with a battery system apart. At this state, the AV is defined as in intermediary configuration, pertinent to the time interval between completing an arrival sequence and initiation of a departure sequence.

(2) A Plurality of Handling Robots

Robotic systems for handling the AV, including wheeled robotic carts configured for approaching the AV, docking with the AV, lifting the AV, conveying the AV between areas of a Vertiport, preferably same robotic carts but also possibly separate robotic systems detaching/attaching battery systems, conveying batteries to and from the Vertiport battery outlet.

The term "robotic system" is used herein to refer to any combination of mobile and fixed automated devices for transporting or manipulating objects. Of particular significance according to certain particularly preferred implementations of the present invention are a plurality of handling robots, which are mobile robots, preferably wheeled, and thus referred to as "robotic carts", that are adapted for docking with and conveying an AV. The handling robots are advantageously freely moving robots with no physical connection to floor, walls or ceiling, and preferably with high maneuverability to facilitate approaching an AV after landing in a random location and orientation. A fleet of interchangeable robots are advantageously provided such that any available handling robot can be allocated to any particular AV conveyance task, and any robot developing a fault can be immediately displaced to a location that will not obstruct the ongoing workflow of the vertiport, and is replaced. Thus, where reference is made in the description and claims to "the handling robot" performing multiple sequential tasks, there is no requirement that it be the same robot for each task. This interchangeability and replaceability allows the vertiport to provide uninterrupted service independent of any technical failure of one or more individual handling robot.

FIGS. 3a-3d describe in perspective, top, front, side and front views an exemplary robotic cart 20 in stand-alone configuration. The robotic cart is a wheeled platform with autonomous navigation capabilities and with three sets of actuators: four AV lifting actuators 22 which may also facilitate locking/unlocking the mechanical connection between the AV and the robotic cart, four battery lifting actuators 24, and eight battery locking/unlocking actuators 26 performing the mechanical connection between the battery and the AV. Further devices, not depicted in the FIG. 3a-d, may also facilitate mechanical, electrical and data connections between the above pairs. The design of such robotic platform as well as its function for AV conveying and energy provisioning is described in detail in U.S. Pat. Nos. 9,932,019 and 10,359,066.

The design of actuators which perform a locking/unlocking function is described in the US Patent Applications 20190344651 and 20200124081.

The robotic cart may have at least three independent wheels each driven by its own electric motor and each steered by its own steering mechanism. Alternatively, several groups of wheels may be used, each group being driven by the same motor. Thus, the robotic cart can move linearly along a desired direction which can be selected by controlling the wheels. One preferable type of steering system that may be used employs mecanum wheels, which are omnidirectional wheels designed for a land-based vehicle to move in any direction. This type of wheel is described in detail in https://en.wikipedia.org/wiki/Mecanum_wheel.

In the subsequent description, the term "cart" may be used for brevity in lieu of the term "robotic cart".

Figure 4A:
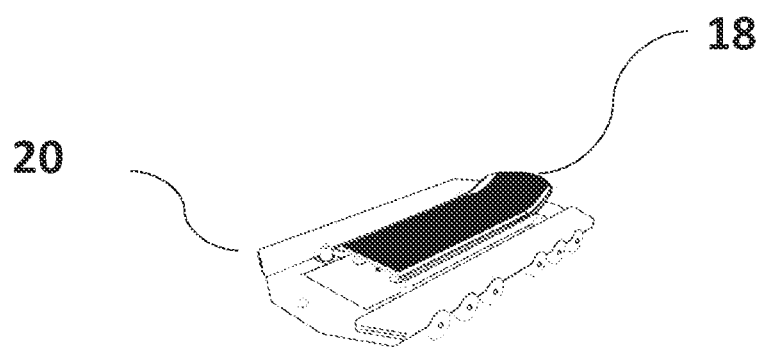
FIGS. 4a-4b present views of the robotic cart battery-conveying configuration from various directions.
Figure 4B:
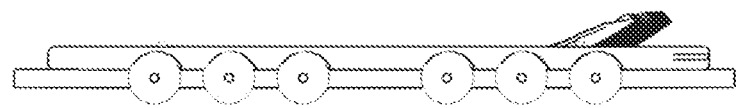

FIGS. 4a-4b describe in perspective and side views of the robotic cart battery-conveying configuration, including a robotic cart 20 attached to a battery system 18. This corresponds to the condition of the robotic cart conveying a battery from an AV to the battery outlet or vice-versa.

A robotic cart may be preferably configured to autonomously position itself under the AV, to lift the AV, to dock with the AV and to convey the AV from its landing spot for purposes such as disembarkation, parking, energy stores swapping, embarkation, and take-off. Numerous solutions for autonomous handling of a multitude of vehicles in a defined ground area have been taught in numerous patent applications and patents, for example US Patent Applications 20170008515, 20170313305 and 20150353080 and therefore the autonomous handling of AV's at Vertiports as involved in the implementation of the present invention is within the realm of knowledge and expertise of the qualified engineers in this field.

It is to be noted that the AV and robotic cart may be in communication with each other during the docking and undocking process through wireless (e.g., radio-frequency and/or optical) communication links. The same links may be active also in the docked configuration in addition to or in lieu of wired communication.

Docking between the two stand-alone vehicles is a guidance operation that may be done in a double-active cooperative manner. Most preferably, docking is an autonomous, automatic operation. The joint docking system preferably includes (a) the interconnected communicating docking systems of both vehicles which may be provided with a multitude of sensors assessing the relative position of the vehicles as the robotic cart docking port is being brought close to the AV docking port at minimal relative velocity, and (b) a set of actuators for accurate positioning and alignment as well as a set of autonomous actuators for securing (structural connection and locking) and subsequently utilities connection.

Figure 5A:
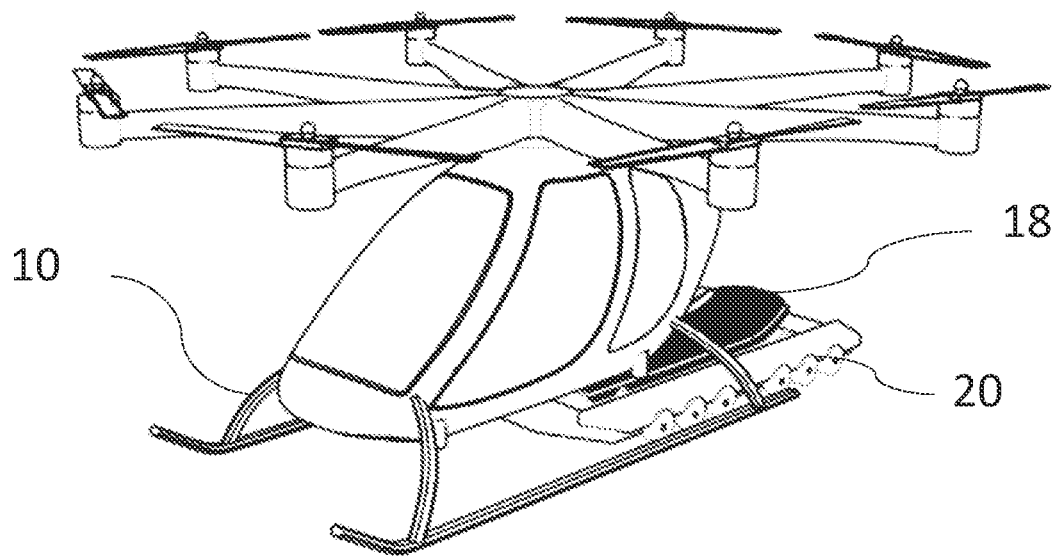
FIGS. 5a-5d present views of the AV from various directions at various stages during a process of a cart docking with the AV.
Figure 5B:
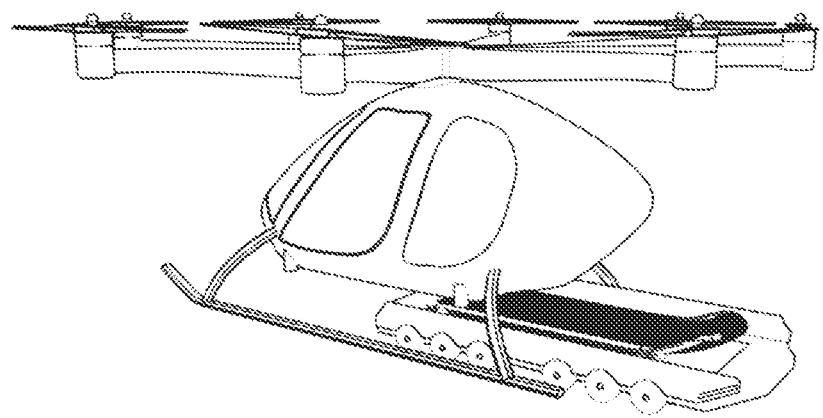
Figure 5C:
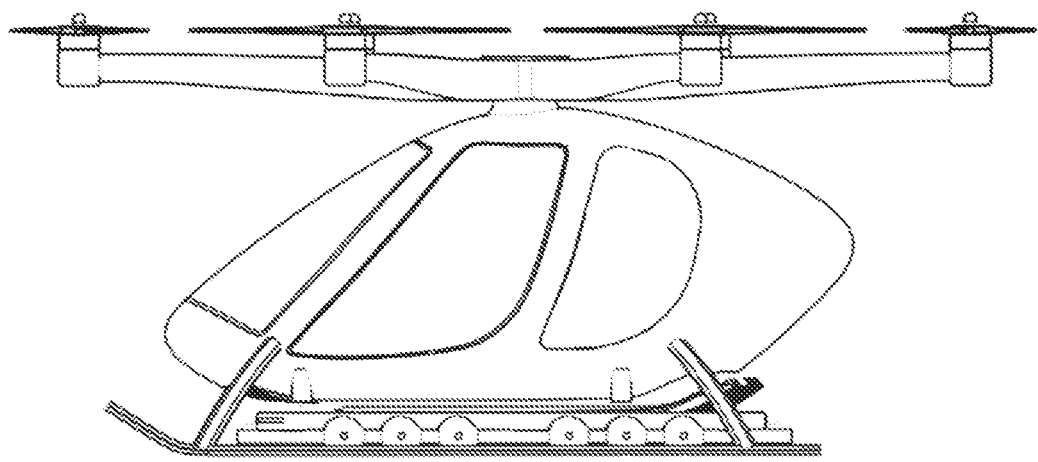
Figure 5D:
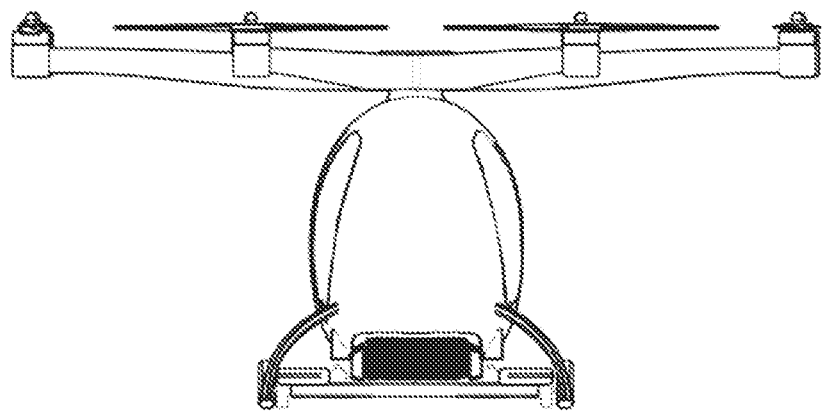

FIG. 5a-5b describe in perspective views an AV 10 with a cart 20 attached to a battery system 18, the cart being partly beneath the AV. FIGS. 5c-5d describe side and back views of an AV 10 docked with a cart 20 attached to a battery system 18, the cart being beneath the AV. This corresponds to the configuration of the AV docked with the robotic cart, prior to attaching the battery or after detaching the battery to/from the AV.

Figure 6A:
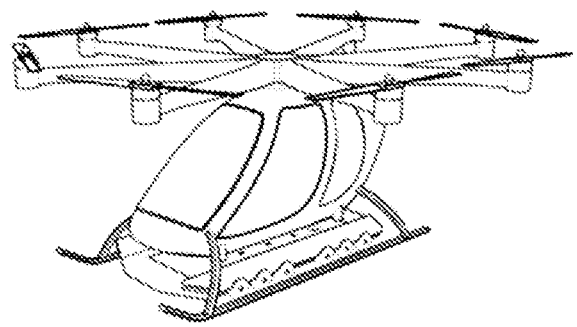
FIGS. 6a-6c present views of the AV with an attached energy store and docked with the robotic cart, from various directions.
Figure 6B:
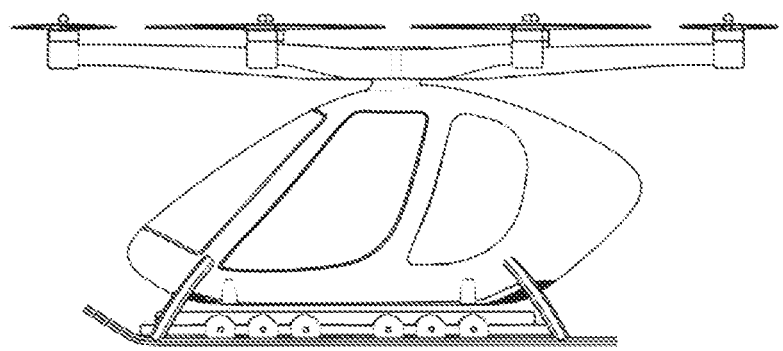
Figure 6C:
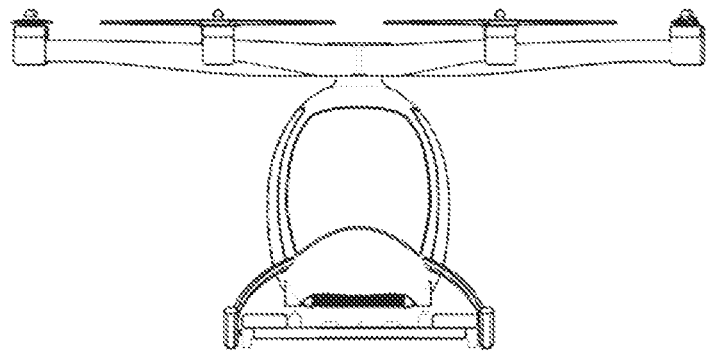

FIGS. 6a-6c describe perspective, side, and front views respectively of an AV with a battery system 18 attached to it, and with a cart 20 beneath the AV. This corresponds to the configuration of the AV docked with the robotic cart, after attaching the battery or prior to detaching the battery to/from the AV.

Figure 7A:
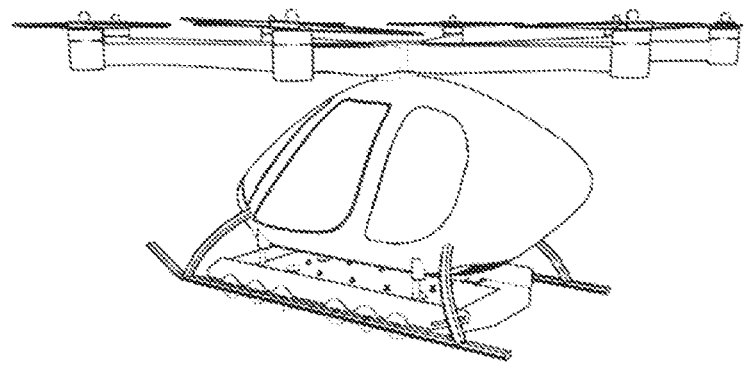
FIGS. 7a-7c present views of the AV without an energy store docked with a cart, shown from various directions.
Figure 7B:
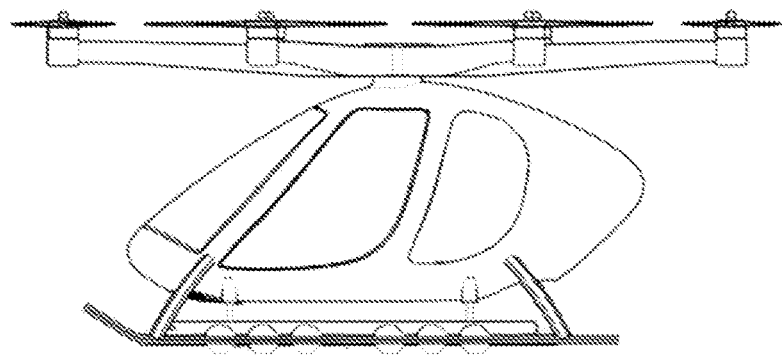
Figure 7C:
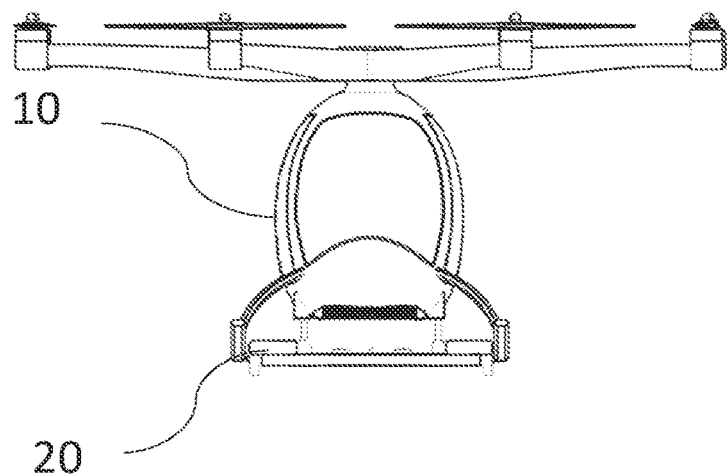

FIGS. 7a-7c describe perspective, side, and front views of an AV 10 with a cart 20 beneath the AV, with no battery attached to any of them. This corresponds to the parking configuration of the AV, in which it can be conveyed to/from the capsule to the parking area and remain in such configuration in the parking area.

Accurately guiding a robotic cart onto an AV may be facilitated by guidance techniques as taught in the paper Perception and Control Strategies for Autonomous Docking for Electric Freight Vehicles, Leopoldo Gonzalez Clarembaux et al., Transportation Research Procedia 14 (2016) 1516-1522 6th Transport Research Arena Apr. 18-21, 2016 which is incorporated by reference in its entirety. Robotic carts can be accurately navigated (e.g., by optical positioning systems or by "marked terrain recognition" techniques) and can be accurately positioned and oriented below the points of the AV structure to be supported, engaged and lifted, of locations also exactly known by similar navigation techniques. Alternatively, even if the position of the robotic cart or the AV on the ground is not known to a high level of accuracy, the robotic carts may autonomously position themselves below the AV and position their lifting actuators exactly below the lifting interfaces of the AV, for example using image processing techniques.

Figure 8A:
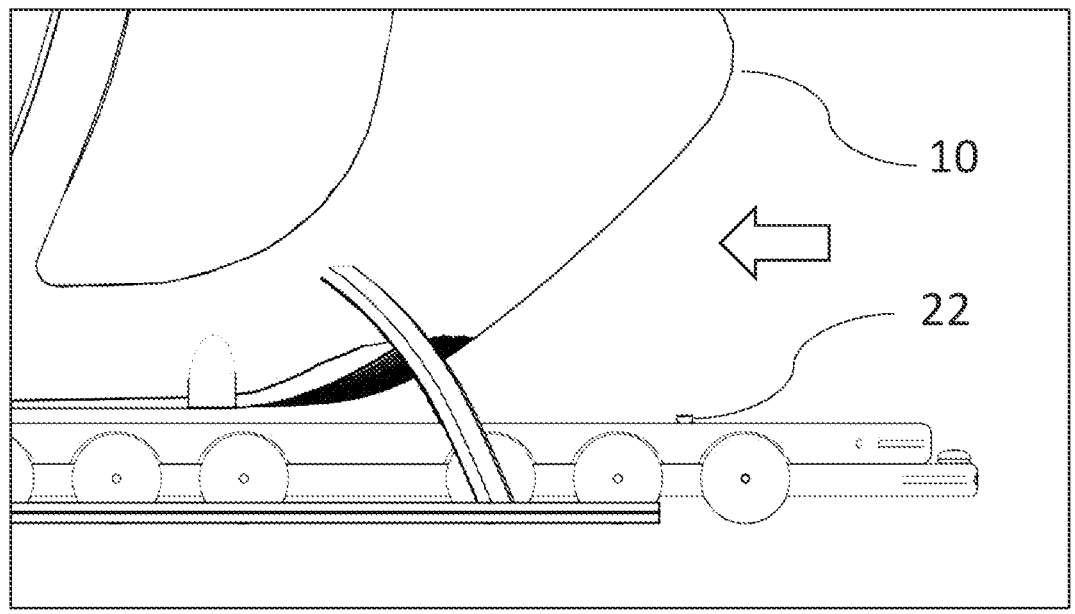
FIGS. 8a-8d present the sequence of steps of a robotic cart lifting an AV.
Figure 8B:
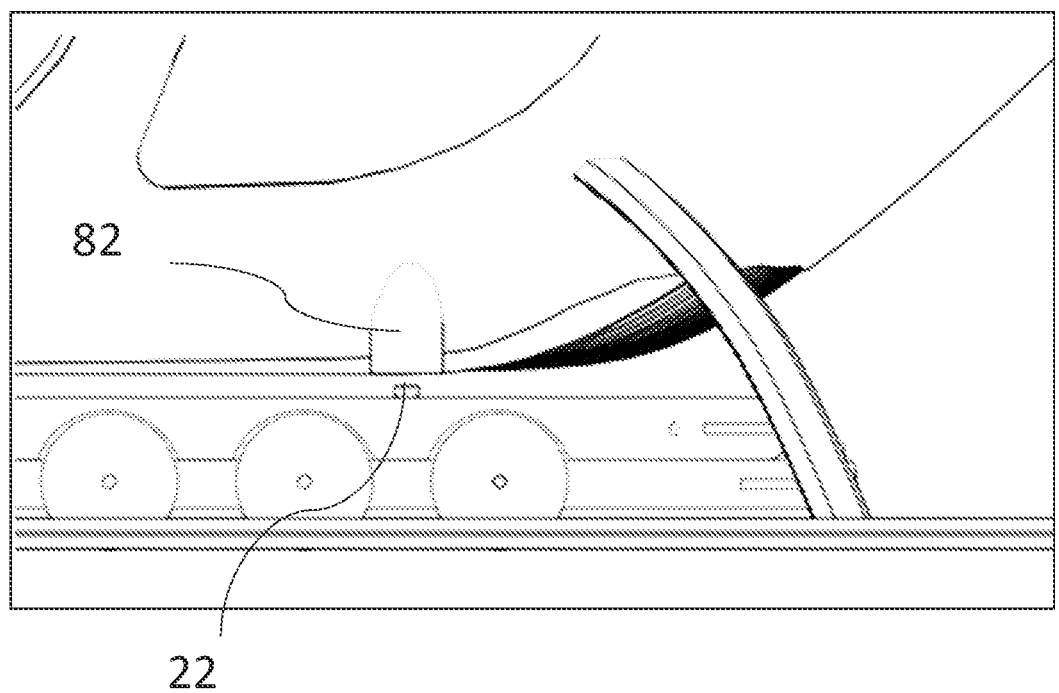
Figure 8C:
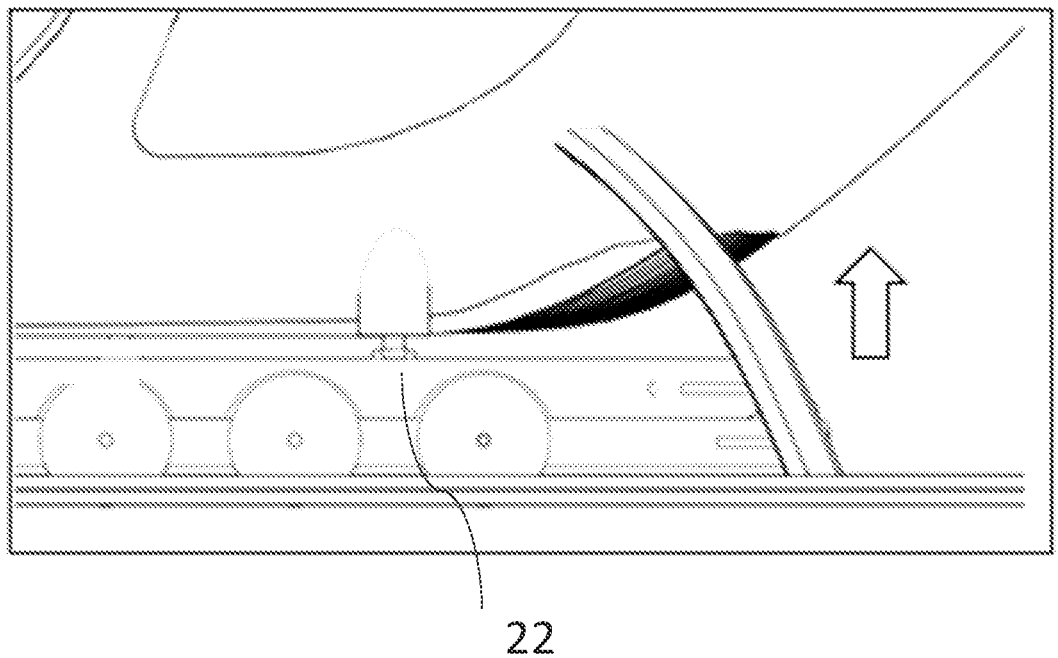
Figure 8D:
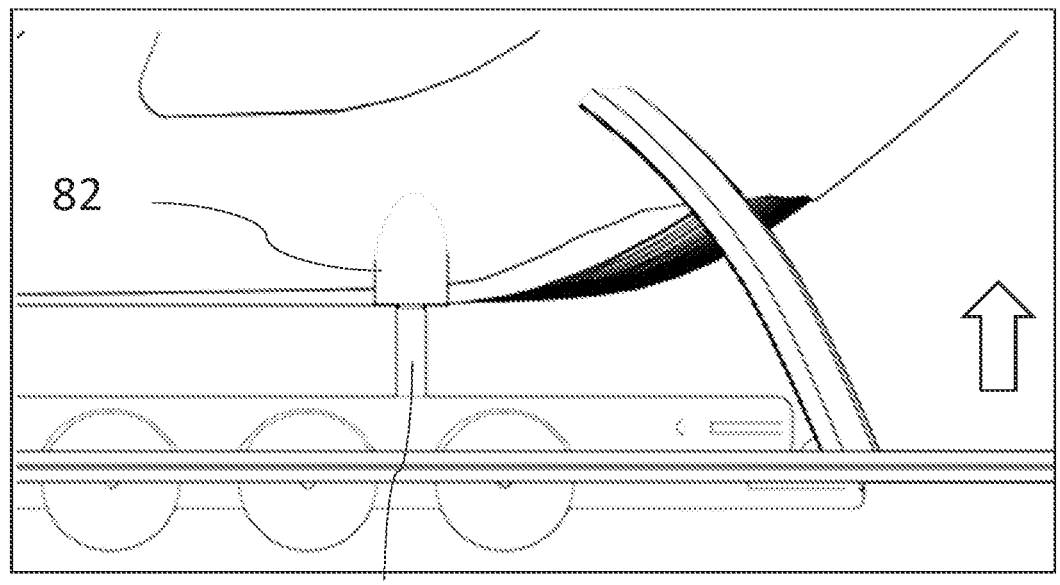

FIGS. 8a-8d describe the process of a robotic cart 20 approaching an AV in flight configuration and lifting it to convey it. After having navigated to the AV, the robotic cart positions itself beneath the AV. (FIGS. 8a-8b) and extends its lifting actuators 22 until they contact the mating interface 82 of the AV (FIG. 8c). Following that, the AV is docked to the cart (operation not depicted) and subsequently the lifting actuators are further extended, lifting the AV above ground by a few centimeters to avoid contact between the skids and the Vertiport surface during conveying the AV. FIG. 8d describes the conveying configuration of the AV with battery attached to it.

Figure 9A:
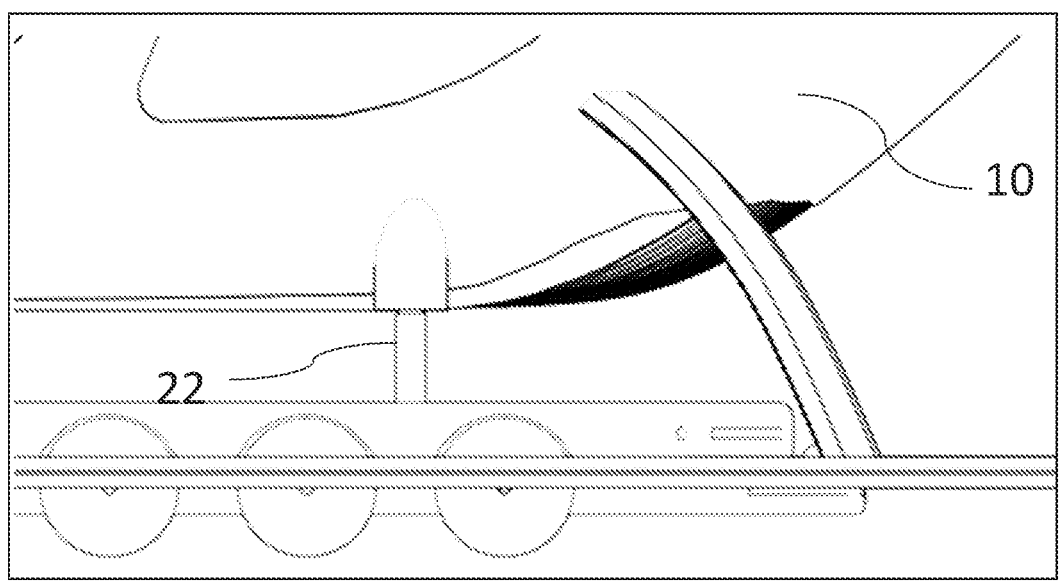
FIGS. 9a-9d present the sequence of steps of transforming the AV from conveying configuration into flight configuration.
Figure 9B:
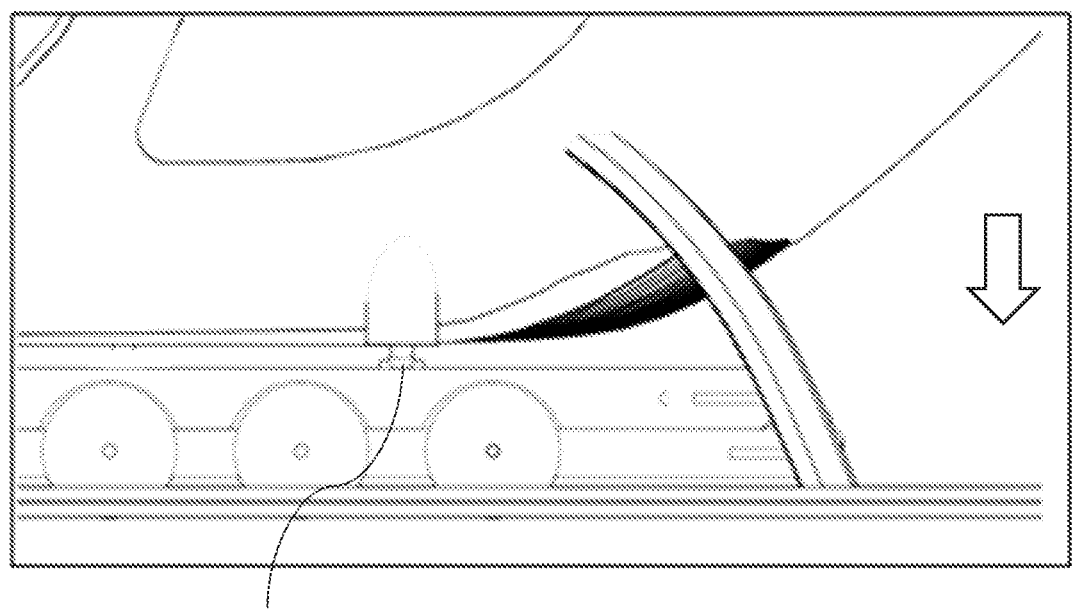
Figure 9C:
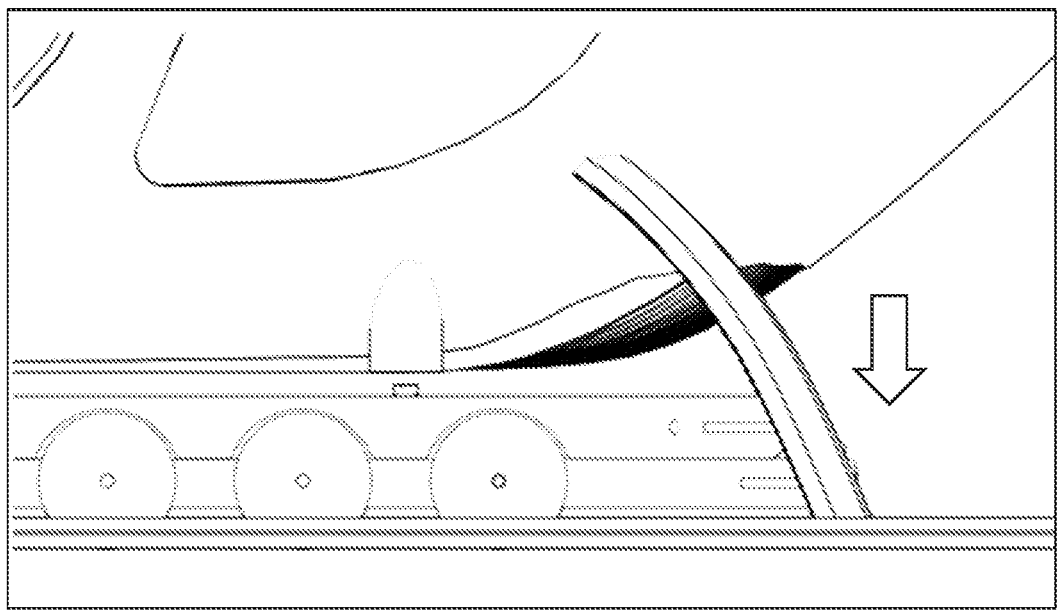
Figure 9D:
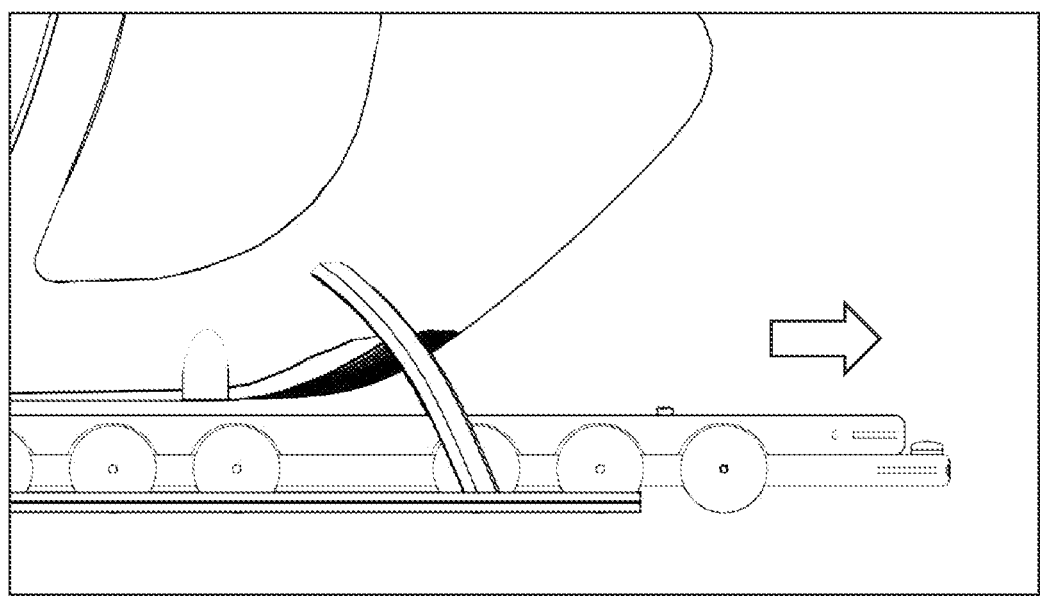

FIGS. 9a-9d describe the process of transforming the AV 10 from conveying configuration into flight configuration, starting from the lifted condition as depicted in FIG. 9a in which the AV lifting actuators 22 are fully extended, partially retracting the AV lifting actuators thus lowering the AV to Vertiport surface level (FIG. 9b), undocking robotic cart from AV (operation not depicted), fully retracting lifting actuators (FIG. 9c) and robotic cart departing (FIG. 9d) from AV, which is thereon in flight configuration.

Figure 10A:
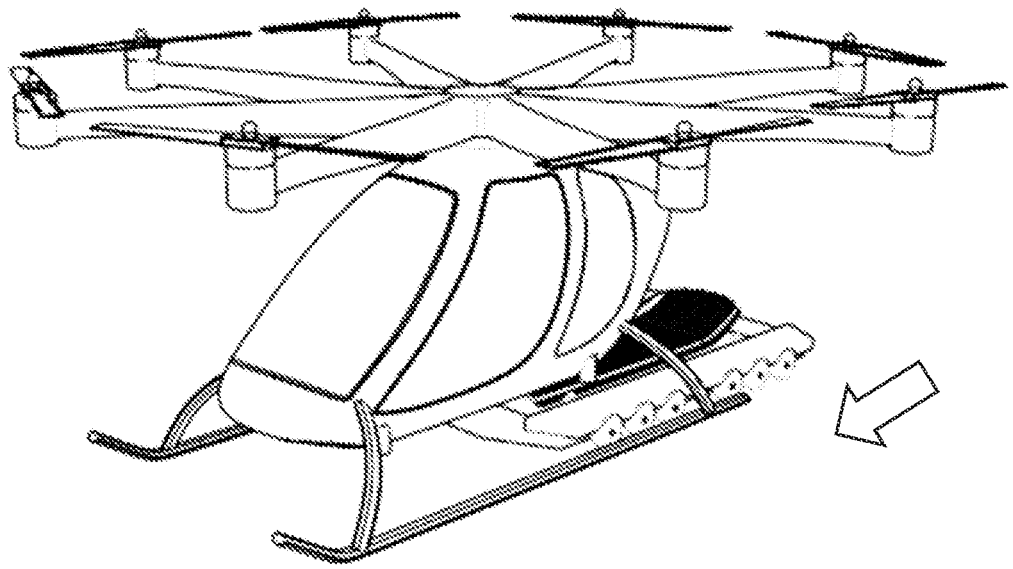
FIGS. 10a-10d present the sequence of steps of battery provisioning to an AV docked with a robotic cart.
Figure 10B:
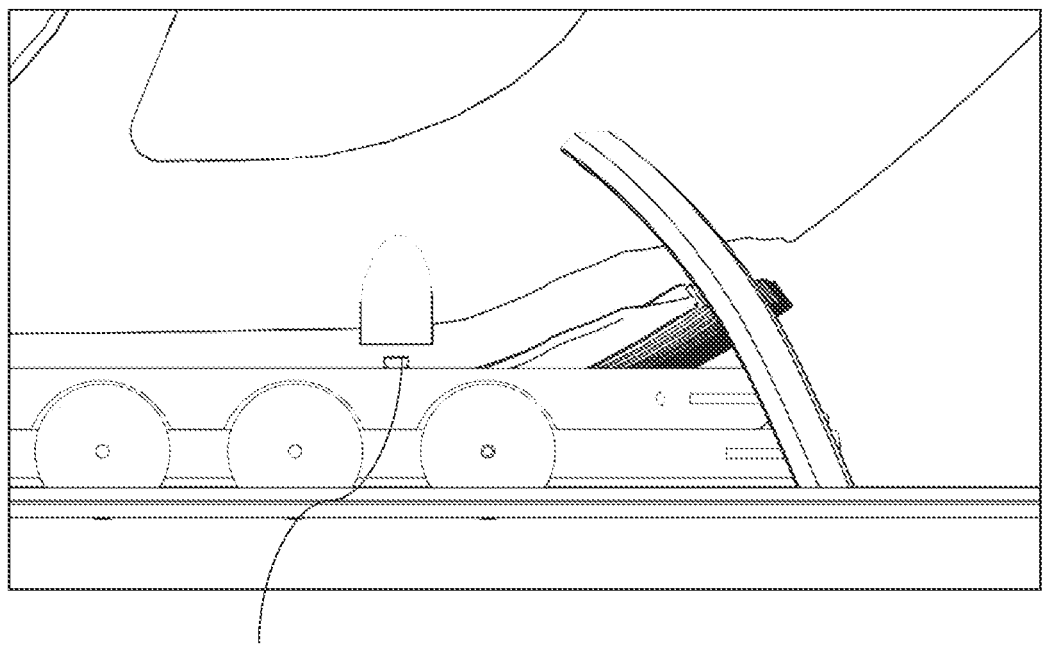
Figure 10C:
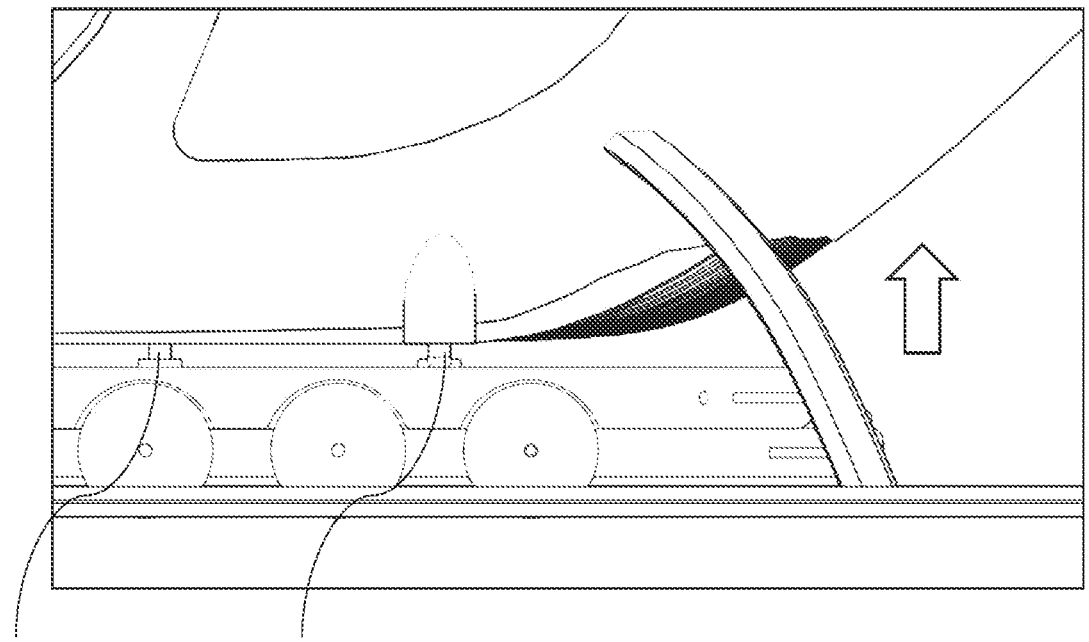
Figure 10D:
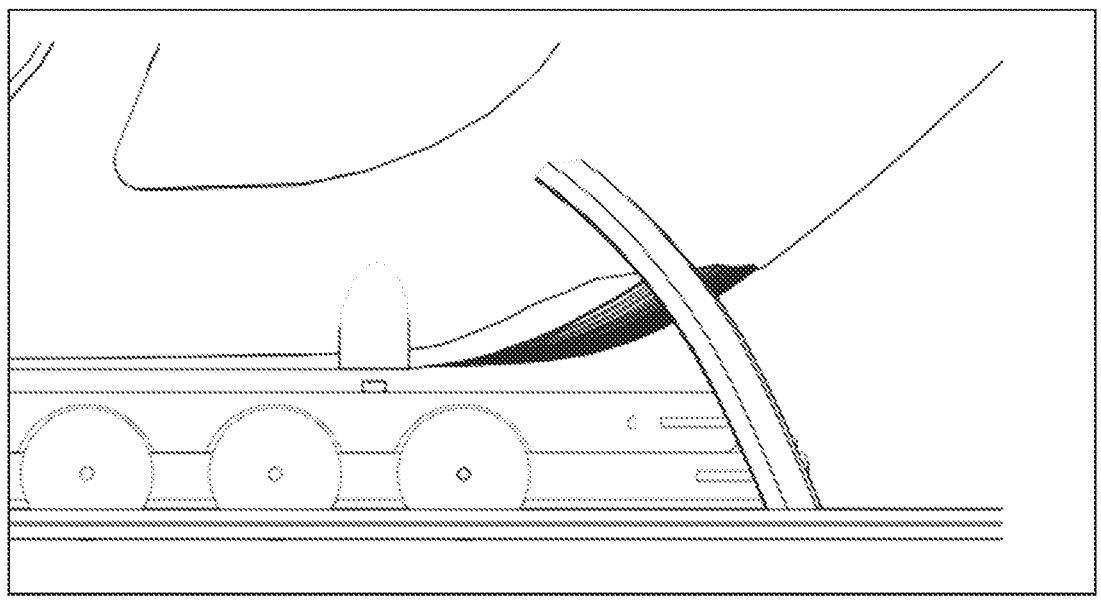

FIGS. 10a-10c describe the process of battery provisioning to an AV docked with a robotic cart, the AV being at Vertiport surface level. FIG. 10a depicts the robotic cart arriving at the AV which is in a condition ready for provisioning of a replenished battery. FIG. 10b depicts the condition in which the battery lifting actuators are retracted. FIG. 10c depicts the condition in which the robotic cart is docked to the AV, where the AV lifting actuators 22 are partially extended. The battery lifting actuators 24 are fully extended and the battery in a position of being attached to the AV. At this time, the battery may be locked to the AV by the battery locking/unlocking actuators 26 (not depicted). FIG. 10d depicts the condition in which the battery is attached and locked to the AV and the battery lifting actuators are retracted into the robotic cart. The AV lifting actuators are also retracted. This condition corresponds to the AV embarkation configuration (with doors still closed). This configuration also applies for disembarkation.

Figure 11A:
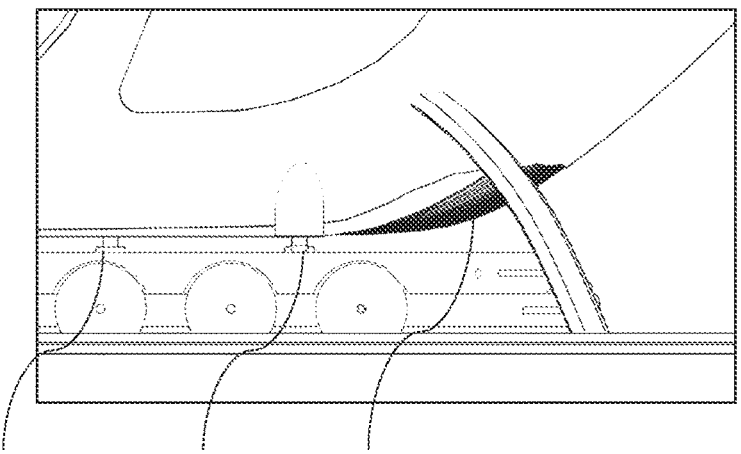
FIGS. 11a-11c present the sequence of the process of battery removal from an AV docked with a robotic cart.
Figure 11B:
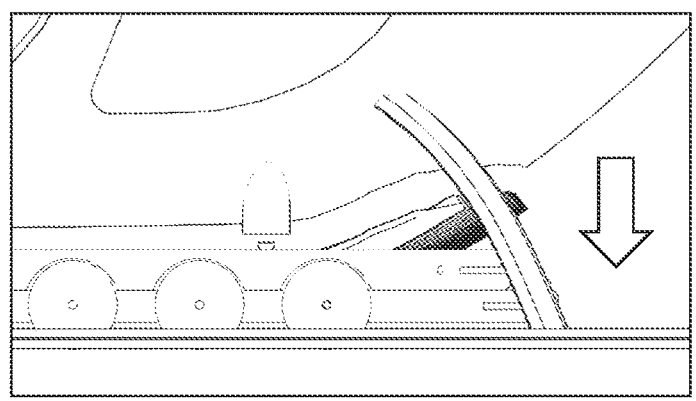
Figure 11C:
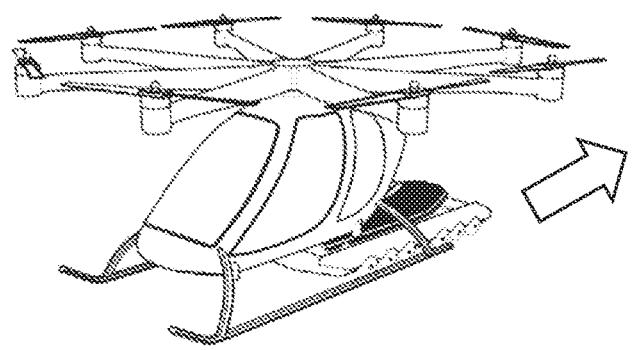

FIGS. 11a-11c describe the process of battery removal from an AV docked with a robotic cart, the AV being at Vertiport surface level. Such process takes place after disembarkation. At the beginning of the process, the AV lifting actuators 22 are in partially extended condition, corresponding to docking of the robotic cart with the AV. FIG. 11a depicts the condition in which the battery lifting actuators 24 are extended and support the battery which may be unlocked and detached from the AV by the battery locking/unlocking actuators 26 (not depicted). FIG. 11b depicts the condition in which the battery lifting actuators are contracted and the AV has been detached from the robotic cart with AV lifting actuators 22 fully retracted into robotic cart. FIG. 11c depicts the robotic cart departing from the AV which is then in a condition ready for provisioning of a replenished battery.

(3) At Least One Vertiport

The stations serving Vertical Take-off/Landing aircraft are generally referred to as Vertiports. Vertiports located on naval vessels are taught for example in U.S. Pat. Nos. 3,785,316 and 5,218,921. A rooftop Vertiport is taught in WO2019020168. In some cases, several floors or levels on the vessel or in the building are needed, including the usage of sizable elevators in order to accommodate the required number of air vehicles in a limited projected area (or surface footprint), as also taught in conjunction with aircraft carriers in US Patent Application 20100294188.

The "landing pad" is a specific functional area on the flight deck of a vertiport set aside for landing and/or take-off of AVs. In existing Vertiport designs, the embarkation zone is typically located relatively far from the landing pads—either at a different floor of a building or, if at the same floor, at a separation of at least 20-40 m. This poses the problem of conveying the AV from the landing pad to the embarkation area, which in the present art is typically performed by elevators or conveyor belts and may be quite time-consuming.

The inherent problems with these designs are their size, their sluggishness and their reliance on a multitude of robotic devices of various sorts integrated with the Vertiport structure.

For area utilization reasons, as well as for achieving low turnaround times, it is favorable to place the embarkation zone at close proximity to the landing pads. However, conditions at the landing pads may typically include adverse effects such as strong winds, air gusts generated by the landing AV's, rain, dirt, and noise. At extreme conditions, there could also be objects travelling at high speed.

Therefore, placing the embarkation zone in the proximity of the landing pads involves the challenge of isolating the embarking passengers from these effects to provide a safe and friendly passenger experience. This is preferably achieved by highly protected embarkation enclosures as embodied by the Capsule as subsequently taught.

Accordingly, it is advantageous to achieve Vertiport compactness, which facilitates low operating costs (rent) and high proliferation. It is also desirable to provide flexible conveyance means for conveying AVs and batteries.

For these reasons, according to the teachings of an aspect of the present invention, the Vertiport topology is preferably optimized to provide extremely short conveyance distances between landing pad, passenger terminal, battery outlet and AV parking. This topology is made feasible by using the robotic cart as a common conveyance mean for conveying AVs and batteries, as well as an intermediary for energy provisioning.

Figure 12A:
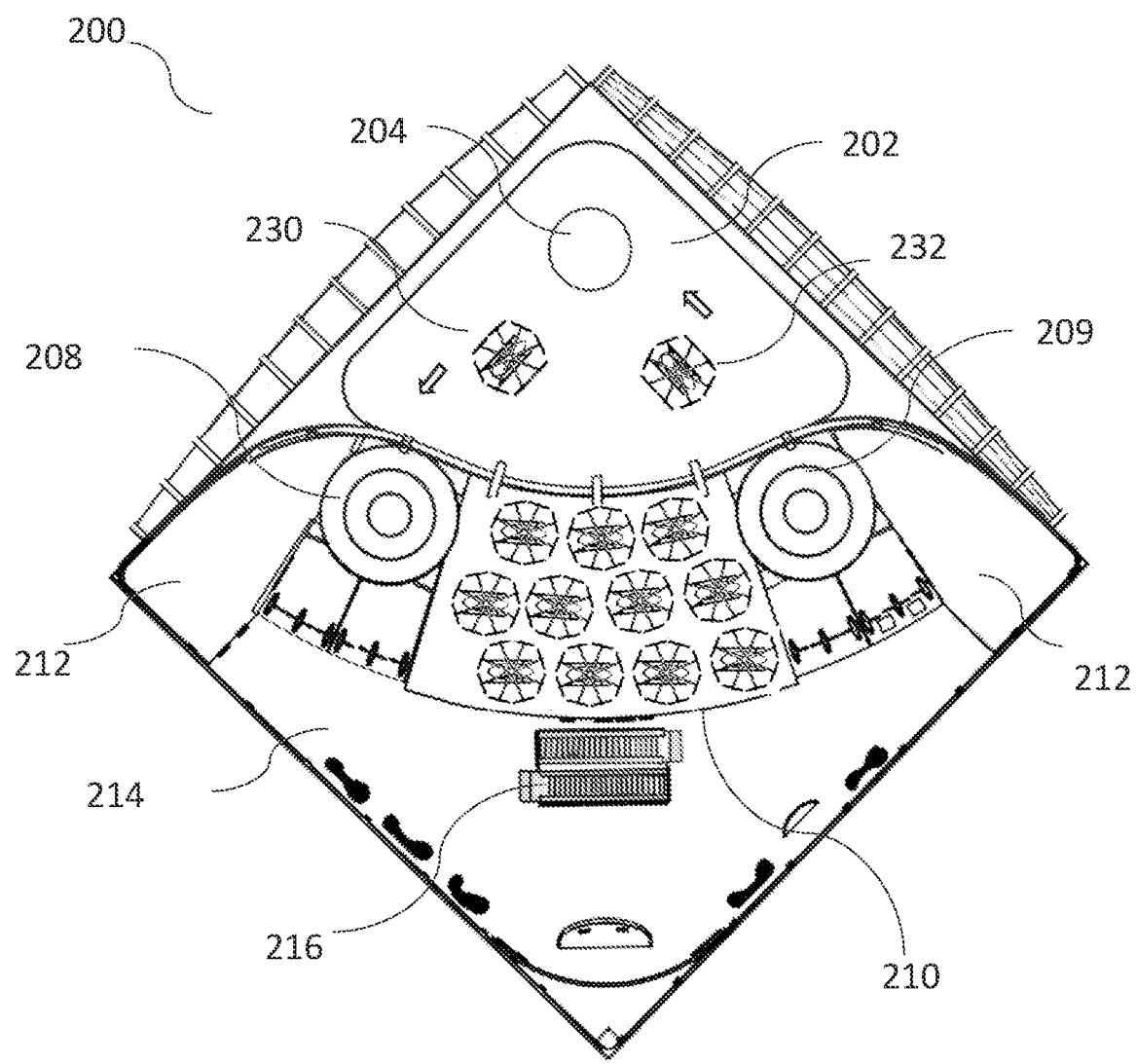
FIGS. 12a-12b present views of the Vertiport from various directions.
Figure 12B:
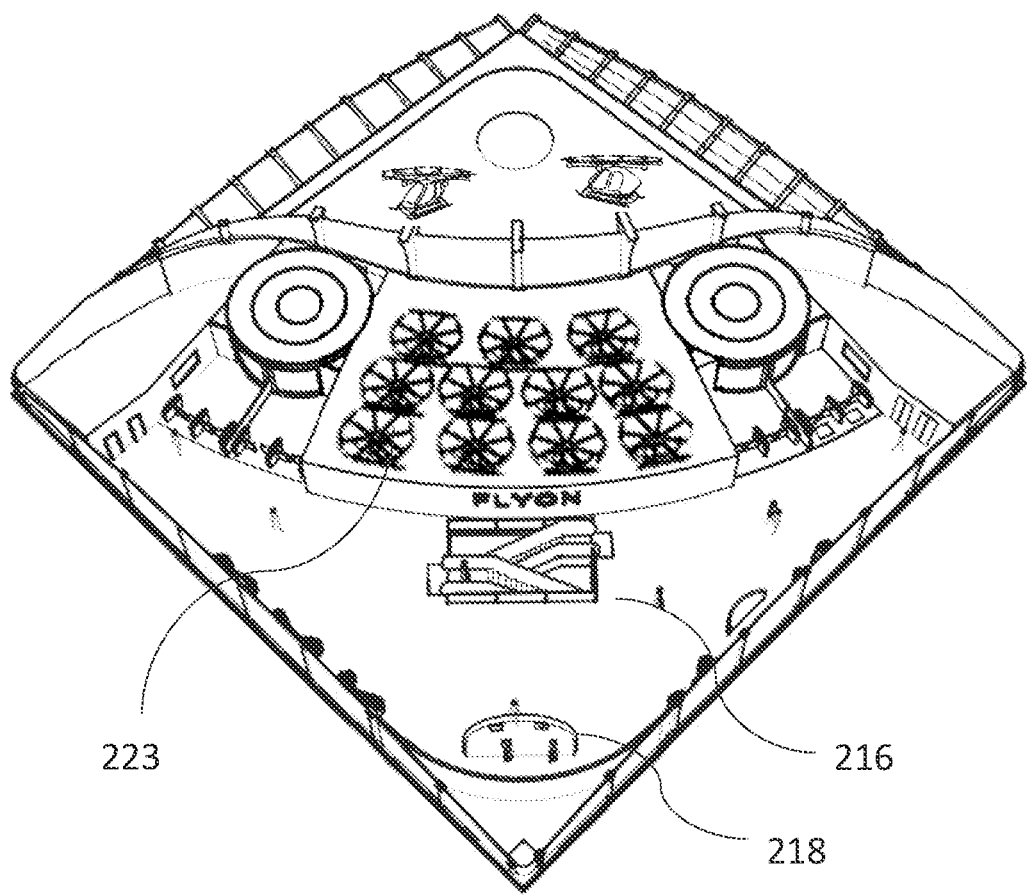

FIG. 12a-12b are top view and perspective views, respectively, from beneath its roof, of the Vertiport 200 accommodated by the rooftop of a standard urban building (45 m*45 m), with its various elements as will be subsequently detailed. These elements include a flight deck 202 including landing pad 204 configured as a turntable, two functional hubs configured as capsules 208 and 209, a parking/maintenance zone 210, two battery charging zones charging zones 212, a passenger terminal 214 and an escalator 216 allowing access to and from a lower floor. The term "passenger terminal" is used herein to refer to any area accessible to passengers prior to and/or after departure/arrival, including areas in which they perform functional procedures such as checking-in to a flight, weighing luggage, and seating for waiting for departing/arriving flights etc. The Vertiport is preferably covered by a roof, except for the flight deck 202. This roof is not depicted in FIGS. 12a-12b, in order to reveal the internal elements.

Since the Vertiport is most preferably implemented on a single floor, the floors of its modules are all located on a common level. in the subsequent description, the terms Vertiport level, flight deck level, capsule floor level, parking zone floor level, battery charging zone floor level are preferably equivalent and may be used interchangeably.

As can be seen in FIGS. 12a-12b, a first AV 232 is carried by a cart from capsule 209, after passenger embarkation, to the landing pad 204 for subsequent take-off. A second AV 230 which has just landed is carried by a cart to capsule 208 for passenger disembarkation. Ten AV's 223 can be seen parked in the parking/maintenance zone 210.

Passengers may arrive to the terminal by from a lower floor by escalator 216 or by elevators, proceed to the reception desk 218 for check-in, be seated and relax in a comfortable waiting area, offered refreshments and wait for an announcement to proceed to the gate on a display or by a personal message.

The various elements of the Vertiport introduced above are hereinafter described in further detail.

(3.1) One or More Capsules

Figure 13A:
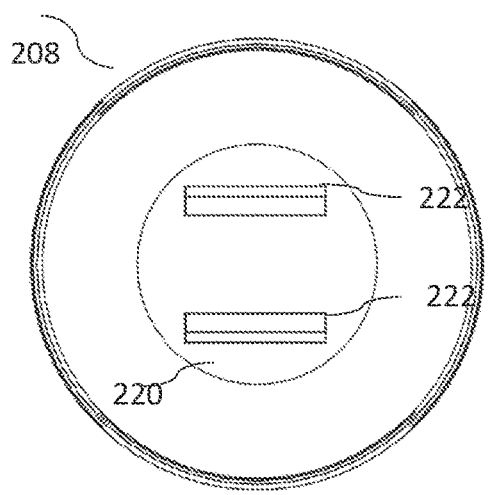
FIG. 13a-13f present views of the Capsule with a set of selectively-deployable steps, shown from various directions.
Figure 13B:
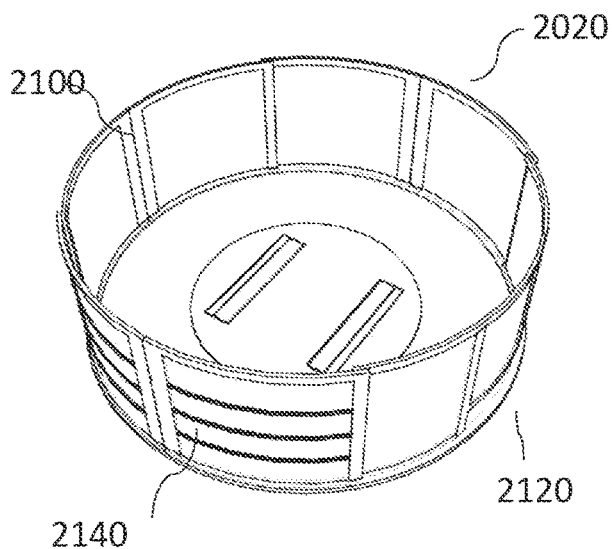
Figure 13C:
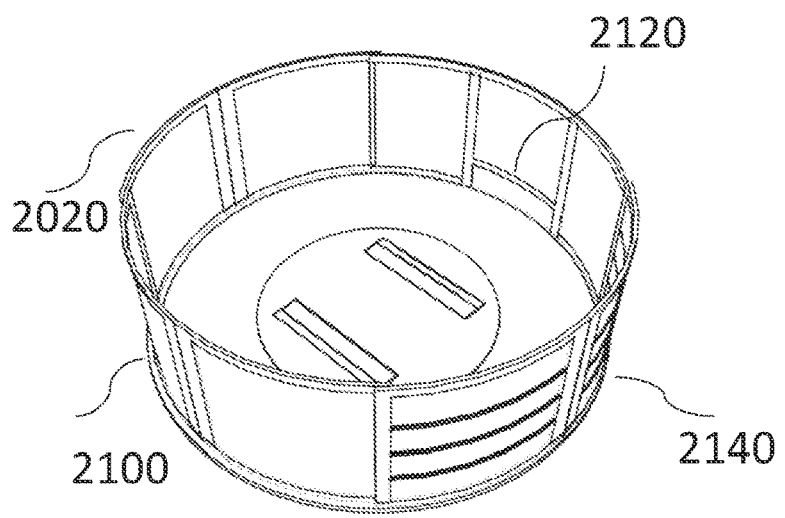

A core element of certain particularly preferred implementations of the Vertiport is a Capsule 208 with bridging functionality at flight deck level. FIGS. 13a-13c describe, respectively, a top and two perspective views (from two different angles) of the capsule. The capsule is preferably located in close proximity of e.g. 10-20 meters from the landing pad it serves. The capsule is a focal point of the system. It provides a stopping point for the AV when arriving from the flight deck 202. from which point it will be conveyed either for a departing flight from the flight deck or to the Parking Zone 210. It provides a safe egress/ingress environment for passengers and it may preferably serve as the location of battery systems swapping. The capsule is a restricted area with multiple doors with exclusive functionality. Normally all doors are closed, except a selected one, and only that one, may be open upon automatic command. With respect to passengers, the doors deny access of non-boarded passengers (i.e., passengers prior to embarkation or after disembarkation) to the flight deck and other areas of the Vertiport and control their access to and from the passenger terminal.

Denying such access is required to avoid exposing the passengers to hazards inherent to the movement of AVs or parts thereof or any of the robotic systems handling the AVs or parts thereof and avoiding any unauthorized contact between the passengers and the AV or any of the Vertiport elements. The aforementioned doors, in addition to controlling passenger access, also isolate them from possibly harsh atmospheric conditions (such as wind, rain, solar radiation, extreme temperature), as well as noise generated by the AV functioning or handling. It is to be emphasized that advantageously, all capsule doors are to be kept "normally closed", meaning that every door is opened precisely for the time required to proceed through it. This is a preferable policy since it maximizes the time in which the passenger terminal is isolated from the flight deck by more than one barrier, which is advantageous in terms of average noise, average thermal isolation, etc.

The capsule doors may be of various dimensions, according to their functionality. The door 2020 facing the flight deck and the door 2100 facing the Parking Zone when open must enable passage of AV conveyed by a robotic cart. The door 2120 facing the battery outlet when open must enable passage of a robotic cart conveying a battery. The door facing the passenger terminal when open must enable passage of embarking passengers carrying or wheeling luggage.

In its most basic function, the capsule 208 is a transition region serving as a buffer between the flight deck and the passenger terminal. When an AV arrives at the capsule, the door 2020 between the capsule and the flight deck will open enabling AV entry into the capsule and arrival at its stopping point. At that time, the door will close and from that moment on the passengers are isolated and protected from hazards and from the harsh environment of the flight deck. Once the door 2140 between the capsule and the terminal gate is opened, they can safely egress the AV cabin and proceed to the passenger terminal. The door between the capsule and the passenger terminal will be kept closed except at the times of passenger ingress/egress. There will be no passenger presence in the capsule whenever activities such as energy store swapping or charging or moving the AV to the parking take place. Consequently, the Capsule makes the AV accessible to the passengers in a safe and comfortable manner.

The capsule may also facilitate connection between the AV and the battery outlet at the Battery Charging Zone, with an energy provisioning robot system serving as an intermediary between the AV and the energy store outlet. The robotic cart performs the provisioning/removing of the battery systems to/from the AV and conveying the battery systems between the AV and battery outlet. The robotic cart carrying the battery will move through a door of the capsule which will open only when all other doors are closed.

The capsule may also facilitate access of the AV to Parking Zone. The AV may be conveyed from the capsule to the parking zone by the robotic cart through a door 2100 of the capsule which will open only when all other doors are closed.

Part of the floor of the capsule may be rotatable by a turntable 220 to change the orientation of the AV so that it will face the direction of travel both at arrival and at departure to provide a more friendly travel experience. Provided are two stowable treading steps 222 submergible in stowed condition by a few centimeters under the capsule floor, which may be deployed upwards, emerging through slits thus providing a comfortable passenger descent accessory from the AV or ascent thereto. The treading steps are deployed only at the time of passenger embarkation/disembarkation, otherwise they are stowed below floor level. The turntable may also serve for orienting the AV unto the door connecting the capsule with the parking zone.

Figure 13D:
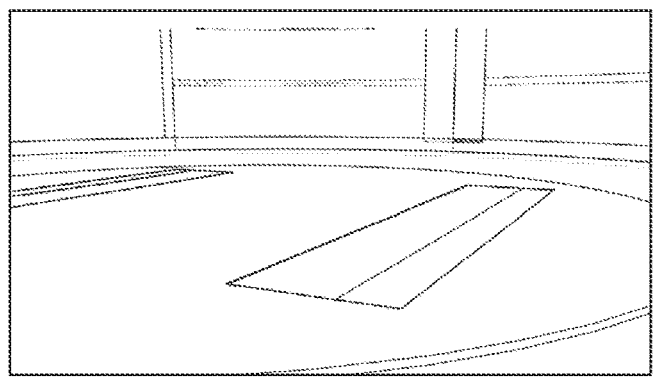
Figure 13E:
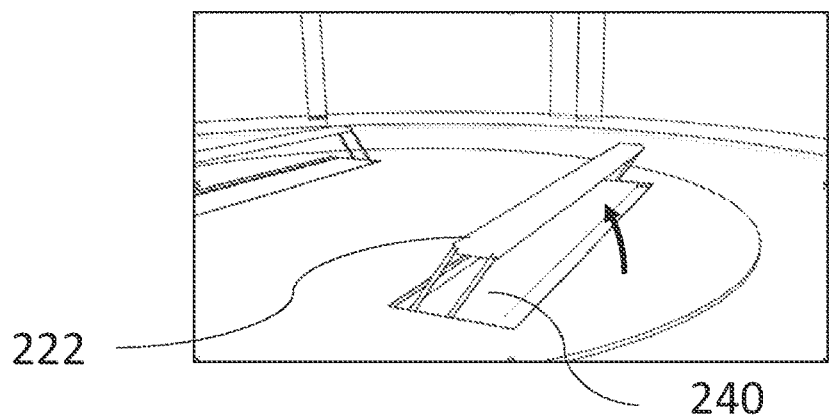
Figure 13F:
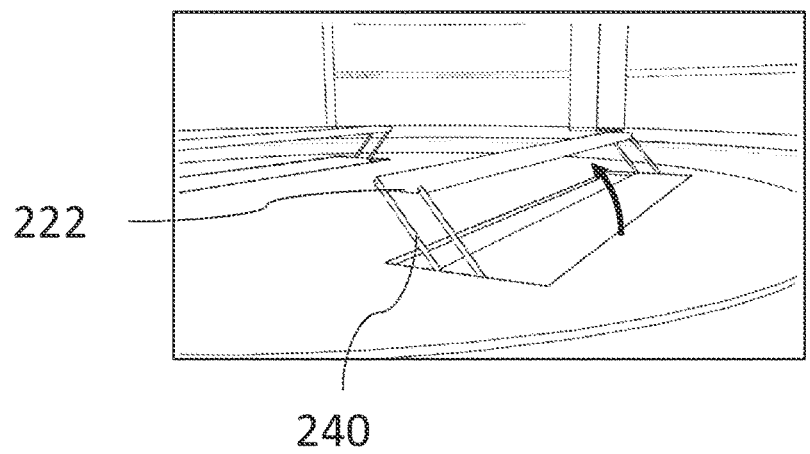

FIG. 13d-13f depict the treading steps stowing operation. FIG. 13d depicts the treading steps 222 in stowed condition. FIG. 13e depicts the treading steps in partially deployed condition, each one supported by four supporting rods 240. Each supporting rod is hinged at one end to a corner of the step and at the other end to the turntable floor. This geometry allows each treading step to deploy from its stowed condition by performing a rotation of around 135 degrees around the turntable floor hinges. A rotation of more than 90 degrees is required in order to connect the treading steps to the cart, overarching the AV skids, as will be subsequently described. FIG. 13f depicts the treading steps in fully deployed condition.

Whereas FIGS. 1-13 have described major system elements and modules, FIGS. 14-25 will describe the Vertiport functionality and flow. FIGS. 14-21 describe the stages of a typical functional cycle, from AV landing to AV takeoff.

Figure 14A:
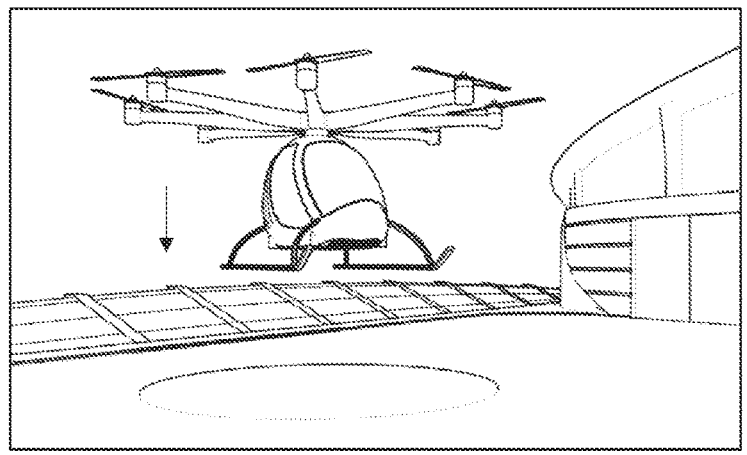
FIGS. 14a-14f present the sequence of steps from AV landing to AV conveyance onto Capsule.
Figure 14B:
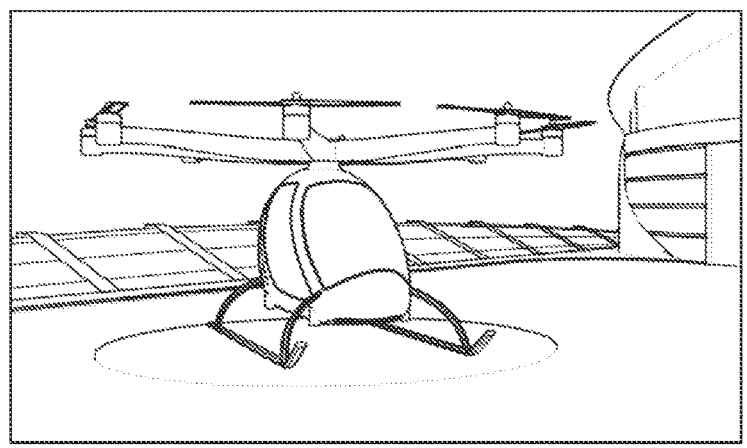
Figure 14C:
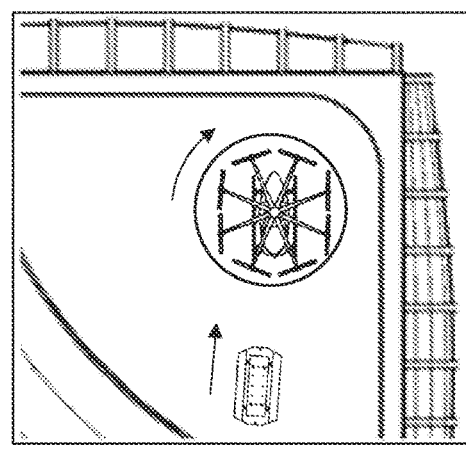
Figure 14D:
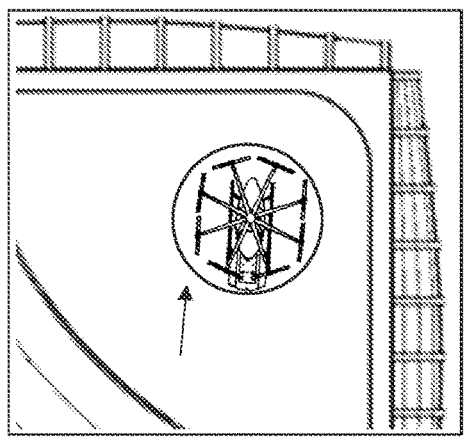
Figure 14E:
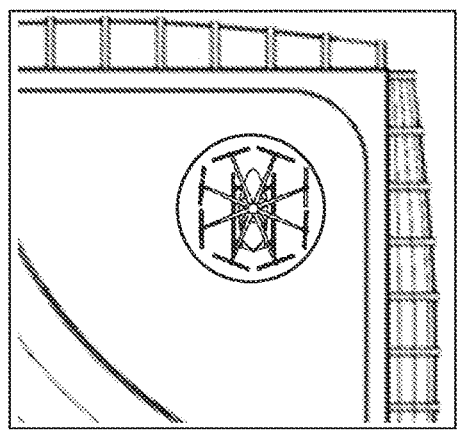
Figure 14F:
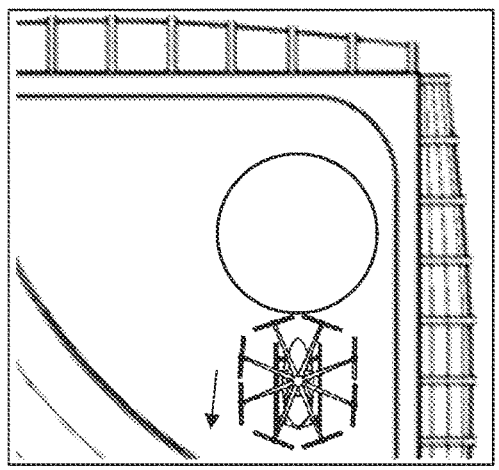

FIG. 14a provided a perspective view of an AV during landing at the landing pad 204 configured as a turntable. FIG. 14b provides a perspective view of the AV immediately after landing on the landing pad. Immediately after landing, the rotors are brought to zero angular velocity and to an angular orientation that minimizes the ground footprint of the AV. Specifically, the rotors at the four side arms are aligned parallel to the longitudinal axis of the AV. Such orientation minimizes the lateral dimension of the AV footprint in order to enable AV passage through Capsule doors facing flight deck and Parking Zone and also to enable more efficient usage of the Parking Zone surface area. FIG. 14c provides a top view of the Vertiport after rotating the pad to orient the AV to an angle corresponding to the direction of approach of the robotic cart arriving from the capsule. FIGS. 14d, 14e, 14f depict the robotic cart getting beneath the AV, lifting the AV and conveying the AV towards the capsule, respectively.

Figure 15A:
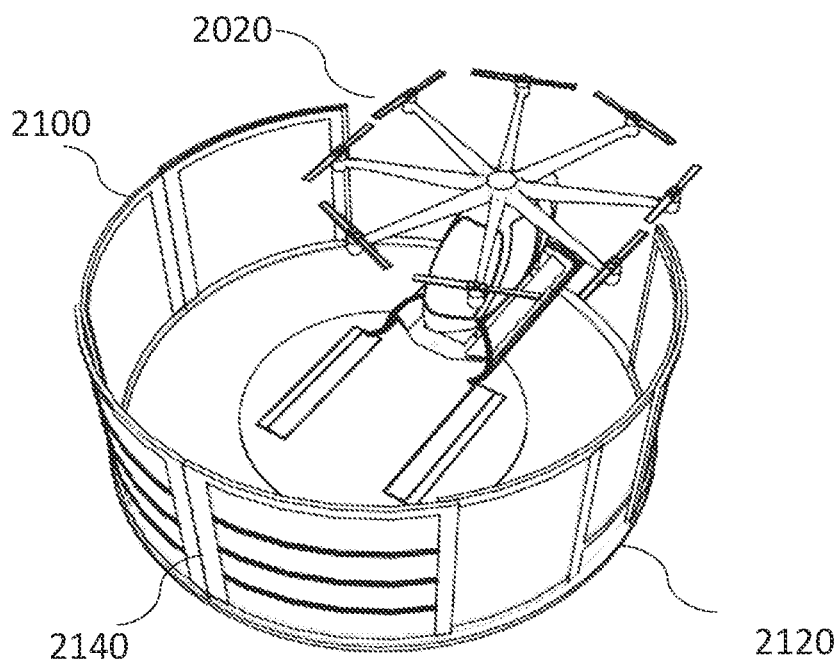
FIGS. 15a-15b present views of the cart conveying the AV at Capsule entrance from various directions.
Figure 15B:
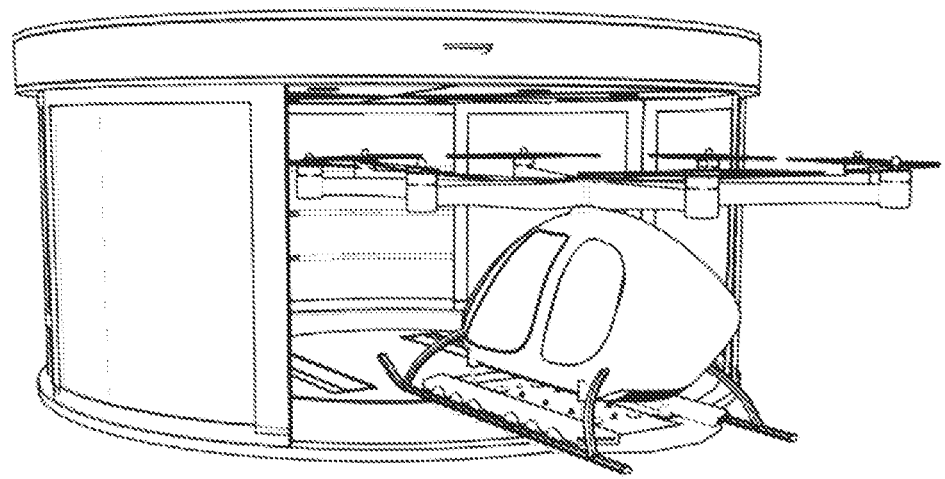

FIGS. 15a-15b provide views from two different angles depicting the cart and AV entering the Capsule carrying arriving passengers. Only the capsule door 2020 facing the flight deck is open.

Figure 16A:
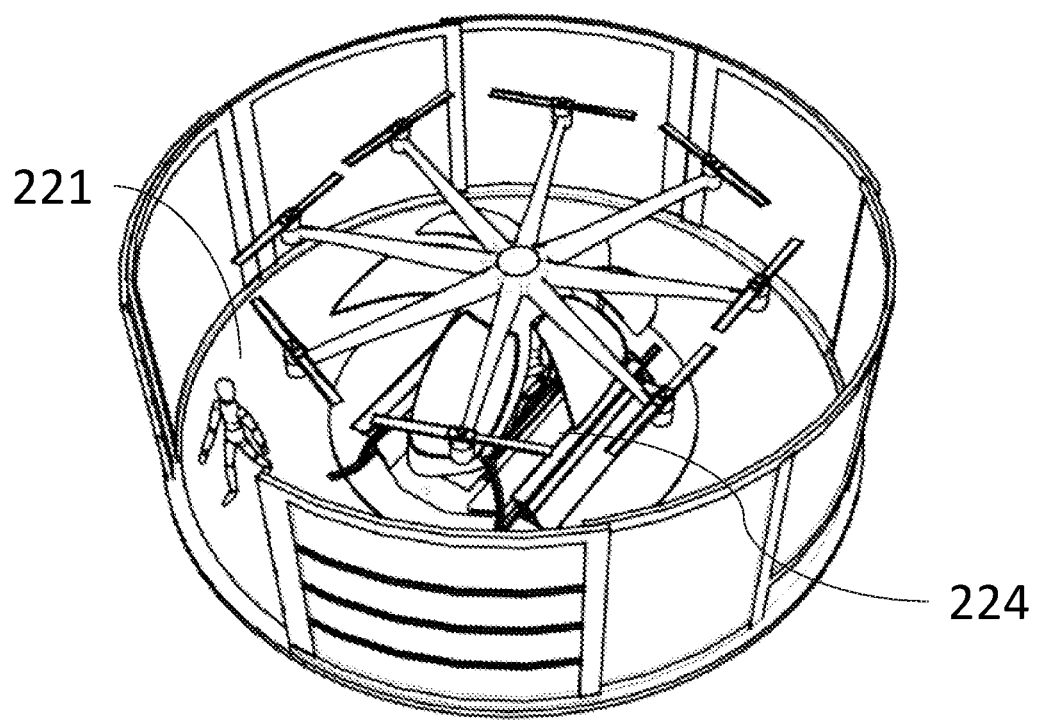
FIGS. 16a-16b present views of the disembarkation from various directions.
Figure 16B:
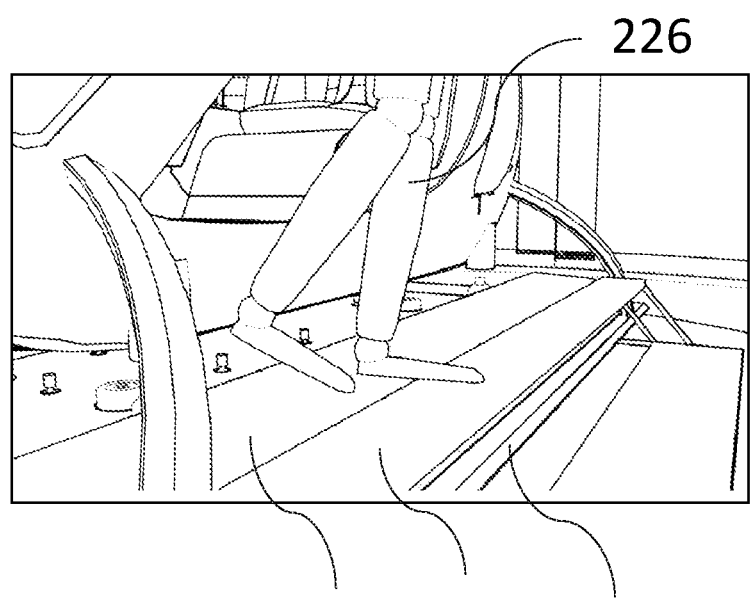

FIG. 16a provides a view of the disembarkation stage. The AV is positioned at the point of halt on the turntable, with treading steps 224 deployed from the turntable floor to facilitate passenger descent to a disembarkation area 221. After deployment of the treading step AV doors are opened. FIG. 16b provides a zoom-in view on the descent of a passenger 226 from the AV. At this stage, the deployed treading step 224 is adjacent and level with the lateral surface at the side of the cart 20, overarching the AV skid 19 to provide the descending passenger a safe and convenient surface for placing his/her foot.

Figure 17A:
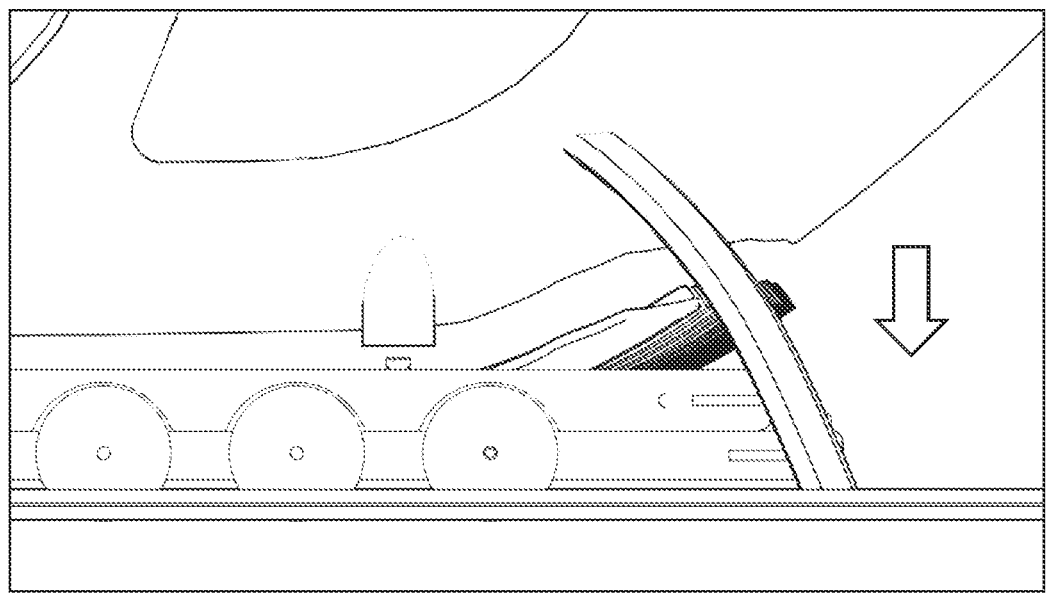
FIGS. 17a-17b present the sequence of steps of the depleted battery removal from AV and conveyance onto the battery outlet.
Figure 17B:
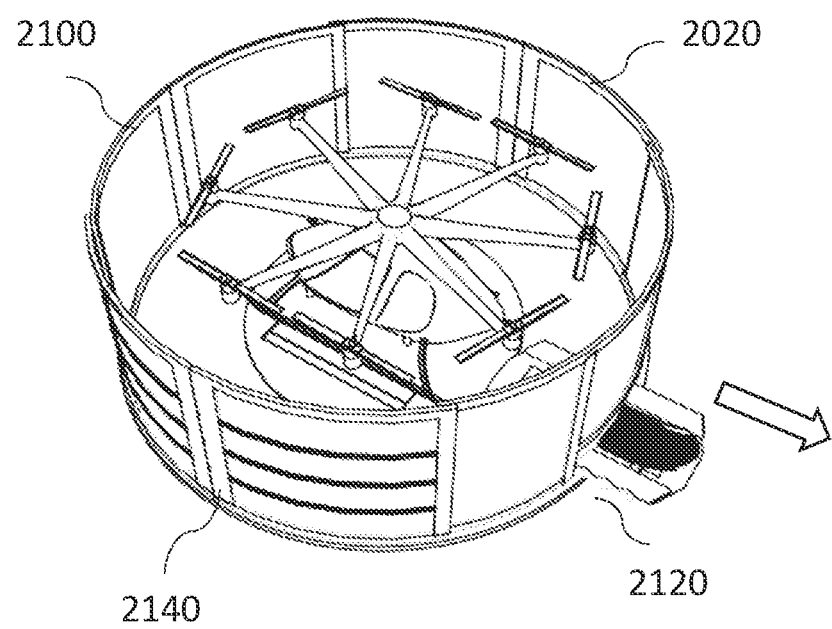

FIGS. 17a-17b provide a view of the depleted battery removal process. FIG. 17a depicts the condition in which the battery lifting actuators are contracted and the AV has been detached from the robotic cart with AV lifting actuators 22 fully retracted into robotic cart, as per the procedure depicted in FIGS. 11a-11c. FIG. 17b depicts the robotic cart conveying a depleted battery from the AV to the battery outlet. Only the capsule door 2120 facing the Battery Zone is open.

Figure 18A:
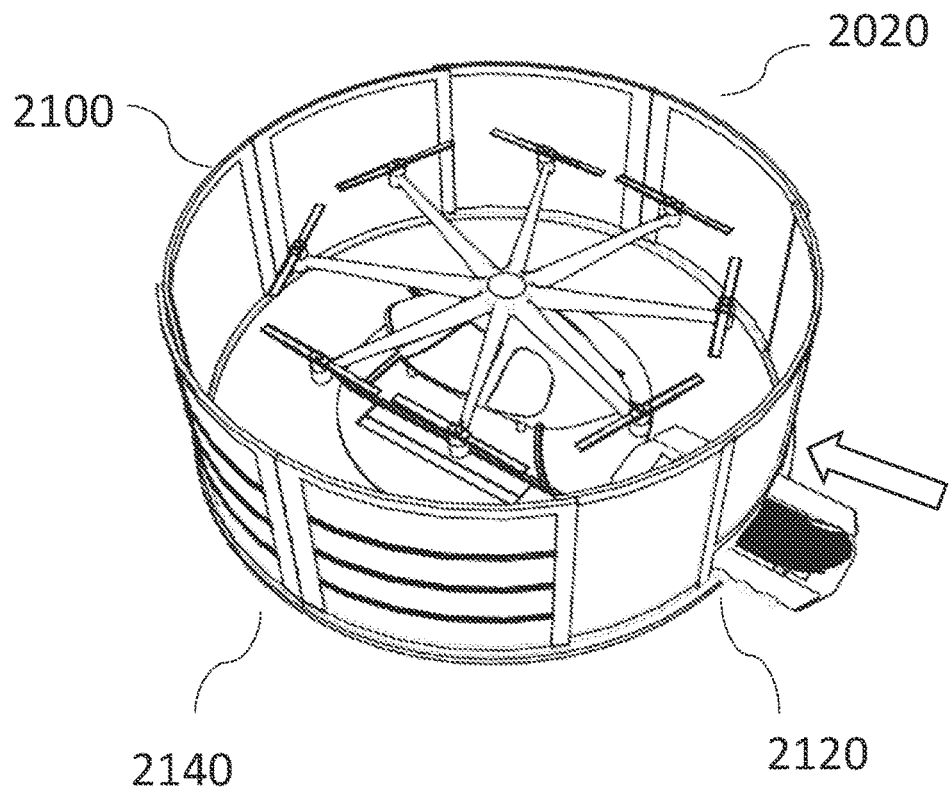
FIGS. 18a-18b present the sequence of steps of arrival of the replenished battery to the Capsule and attachment to the AV.
Figure 18B:
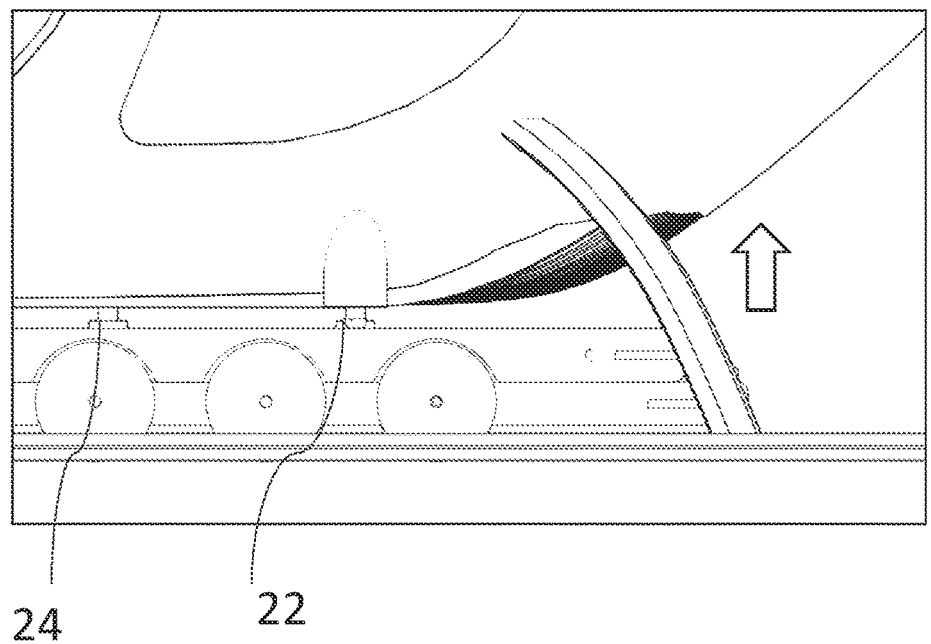

FIGS. 18a-18b provide a view of the replenished battery attachment process. The treading steps remain stowed and turntable remains with its rear end facing the Battery Zone. FIG. 18a depicts the robotic cart conveying a replenished battery from the battery outlet to the AV. Only the capsule door 2120 facing the Battery Zone is open. Under these conditions, as depicted in FIG. 18b, the robotic cart attaches the battery to the AV, per the procedure as depicted in FIGS. 10a-10d.

Figure 19:
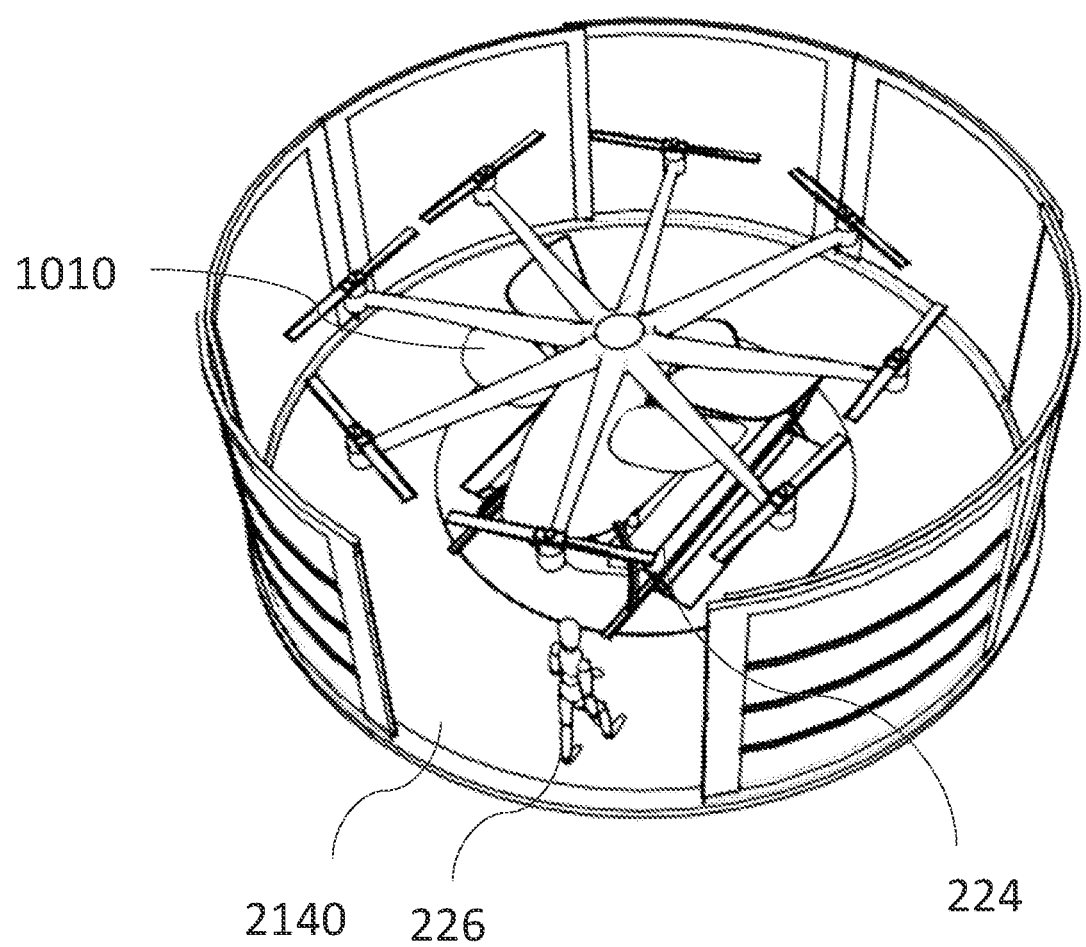
FIG. 19 presents a schematic isometric view of the Capsule illustrating embarkation of passengers to the AV.

FIG. 19 provides a view of the embarkation stage. The AV is positioned facing the landing pad, with treading step 224 deployed from turntable floor to facilitate passenger 226 ascent and with AV doors 1010 open. Only the capsule door 2140 facing the passenger terminal is open.

Figure 20A:
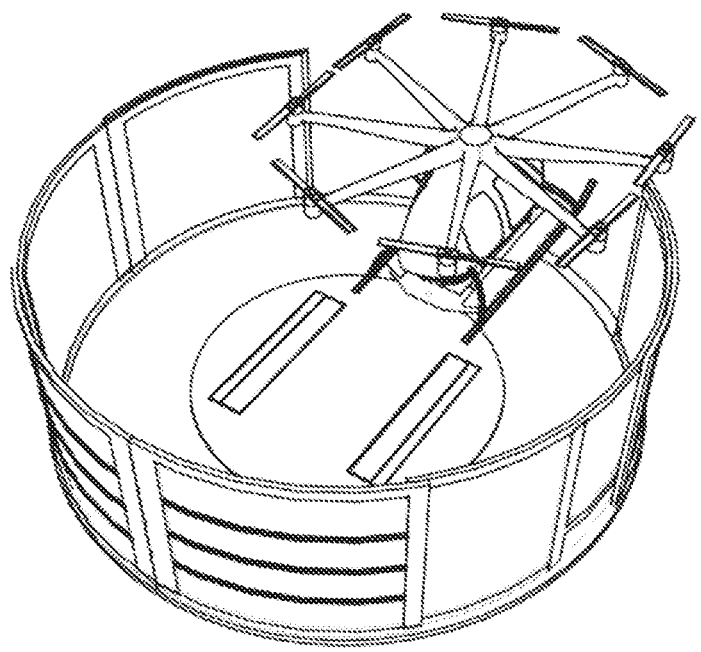
FIGS. 20a-20b present views of the cart conveying the AV at Capsule exit from various directions.
Figure 20B:
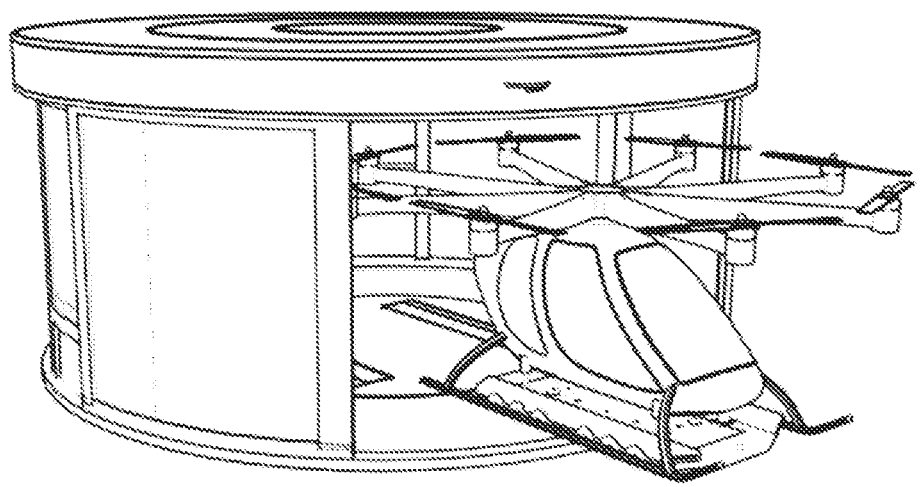

FIGS. 20a-20b provide perspective views from two different angles depicting the cart conveying the AV exiting the capsule towards the landing pad. Only the capsule door 2020 facing the flight deck is open.

Figure 21A:
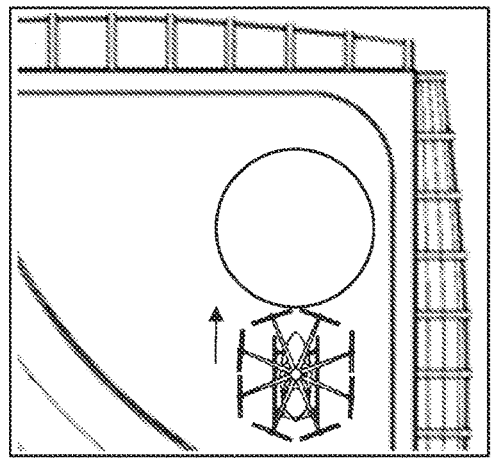
FIGS. 21a-21e present the sequence of steps of the AV conveyance from Capsule onto AV take-off.
Figure 21B:
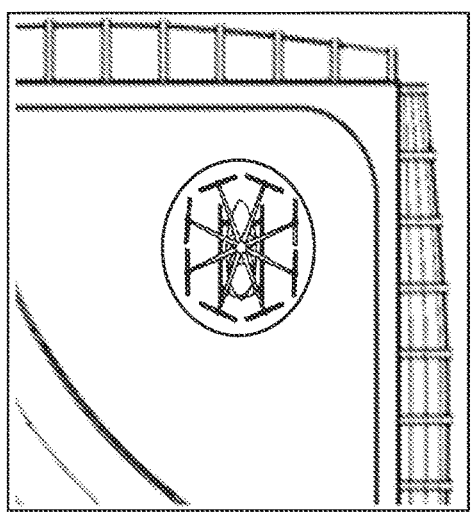
Figure 21C:
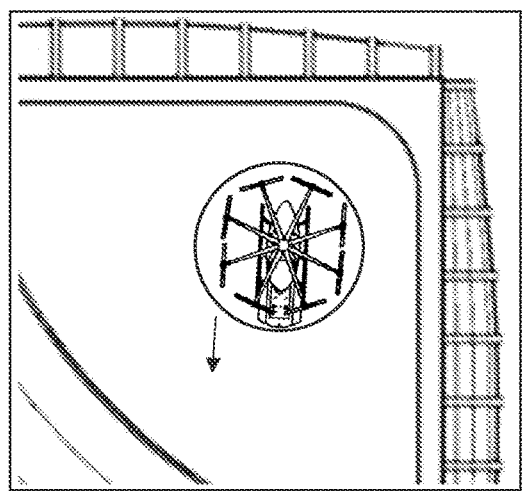
Figure 21D:
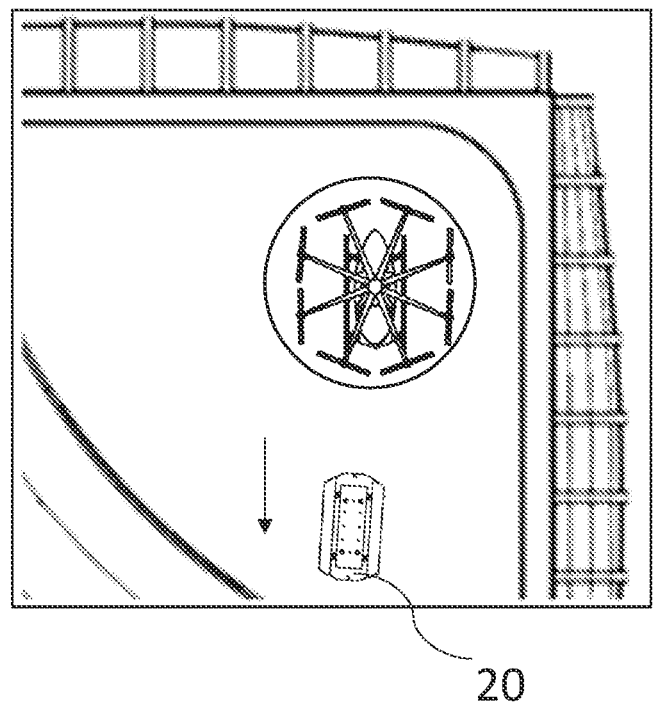
Figure 21E:
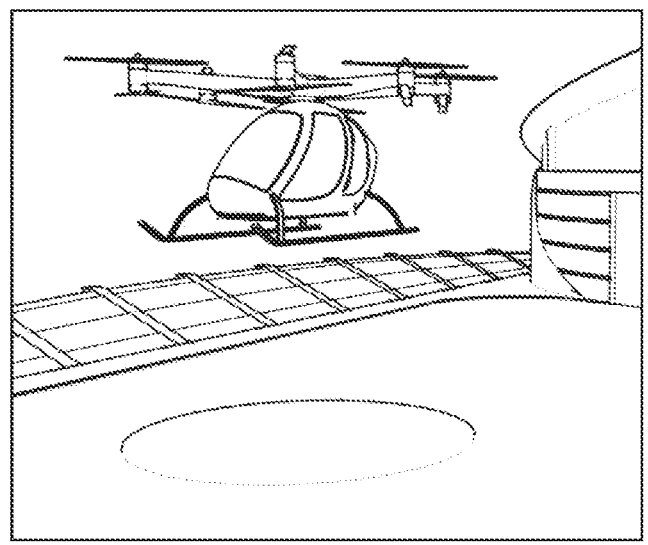

FIGS. 21a-21e provide views of the take-off process. FIG. 21a is depicts the AV being conveyed by the cart from the capsule onto the pad. FIG. 21b depicts the robotic cart still docked with the AV halting on the landing pad. FIG. 21c depicts the cart undocking and departing from the AV. FIG. 21d depicts the cart heading back to the Capsule. FIG. 21e provides a perspective view of the AV just after take-off.

Figure 22A:
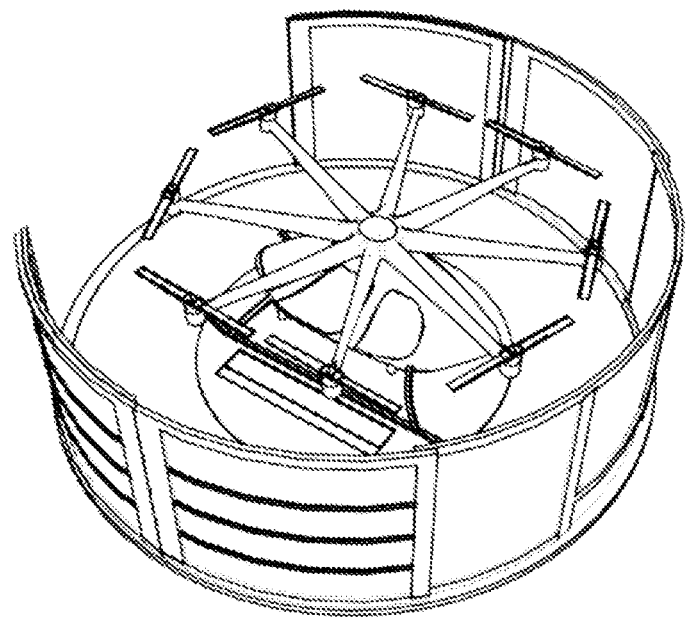
FIGS. 22a-22d present the sequence of steps of the AV parking process.
Figure 22B:
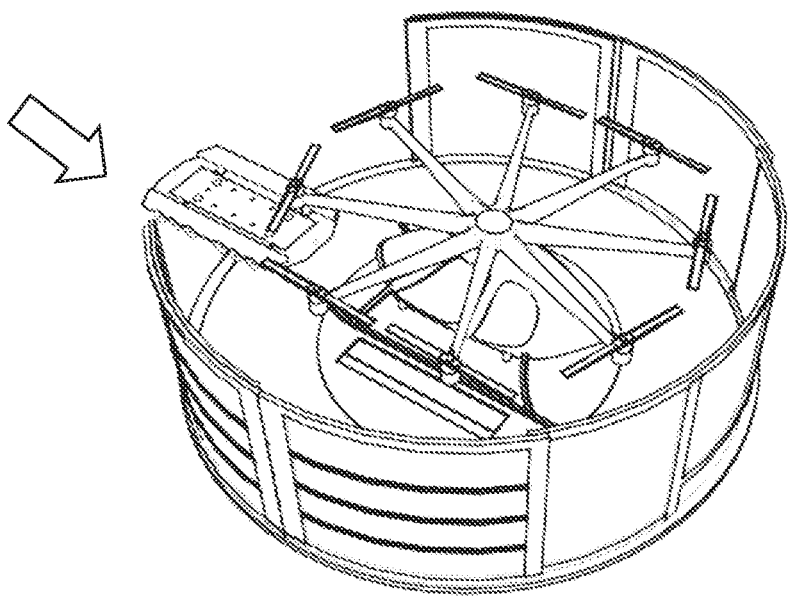
Figure 22C:
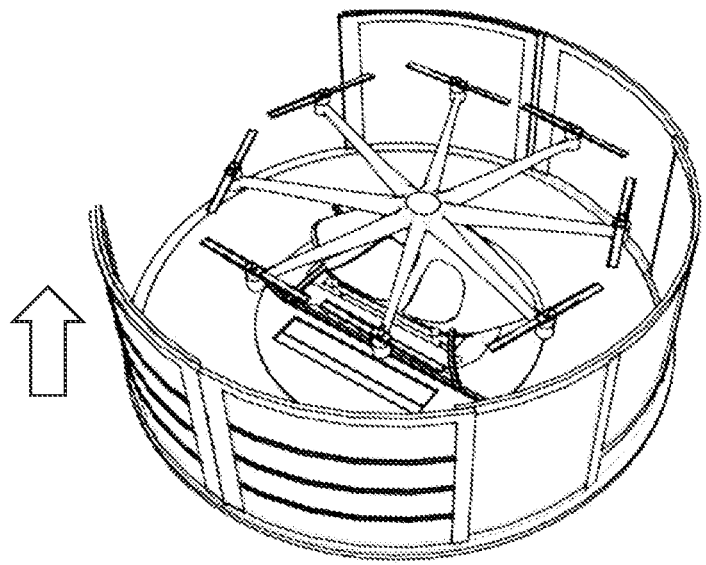
Figure 22D:
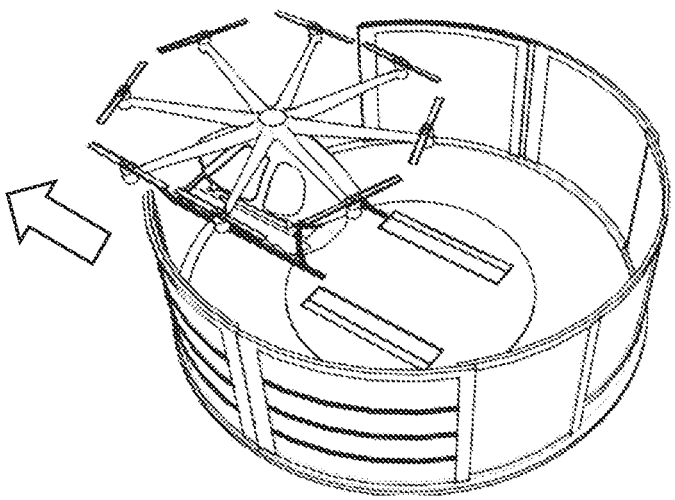

FIGS. 22a-22d provide perspective views of the AV parking process. FIG. 22a depicts the turntable rotated to a position where the AV faces the parking Zone. FIG. 22b depicts the arrival of a robotic cart from the Parking Zone. FIG. 22c describes the AV docked with the robotic cart, thus in parking configuration. FIG. 22d depicts the departure of the AV to the Parking Zone. Only the capsule door facing the Parking Zone is open.

Figure 23A:
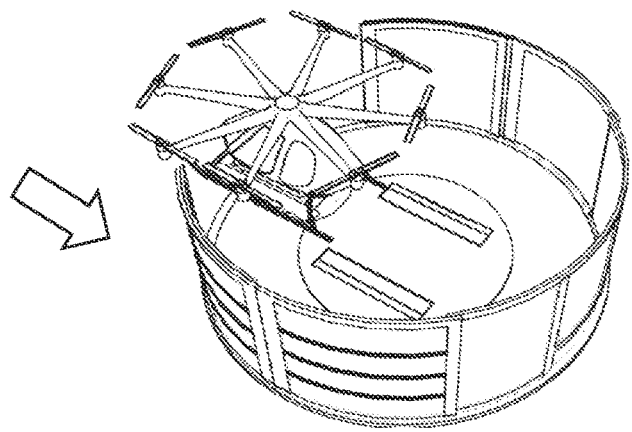
FIGS. 23a-23c present the sequence of steps of the AV retrieval from parking process.
Figure 23B:
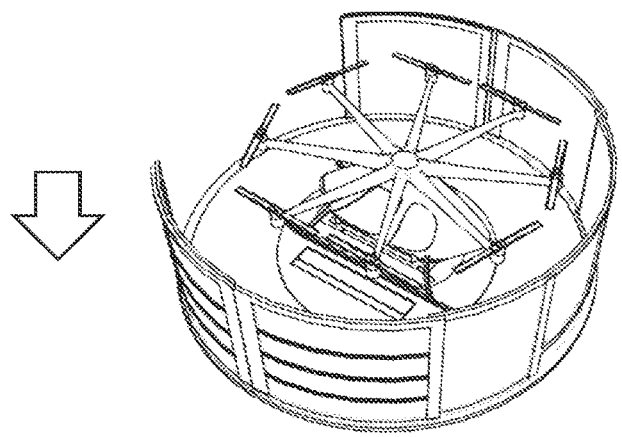
Figure 23C:
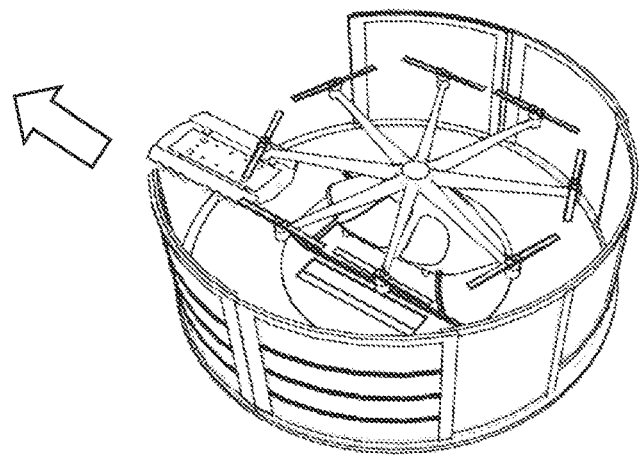

FIGS. 23a-23c provide perspective views of conveying an AV from the Parking Zone to the capsule. FIG. 23a depicts the arrival of the cart and AV in parking configuration from the Parking Zone. FIG. 23b describes the cart and AV halted on the turntable. FIG. 23c describes the departure of the robotic cart to the Parking Zone. Only the capsule door facing the Parking Zone is open.

(3.2) One or More Flight Decks

Flight decks 202, each of them with at least one landing pad 204, each flight deck extending in an uncovered essentially horizontal area, preferably at roof-top level. The flight deck (or airfield) must be a restricted area, in which pedestrian or vehicular access is prohibited unless specifically coordinated and accidental animal access is prevented to avoid harm or injury to any of them as well as to the multicopter and its occupants. Typically, after landing the AV must be removed from the landing pad to a predetermined clearance distance to allow other AV's to takeoff or land. As the landing pads are typically a bottleneck of the Vertiport operational cycle, the time for performing this action has a strong impact on Vertiport efficiency and throughput. As it will be subsequently detailed, a favorable solution for this action is using a robotic cart. The landing pad with an AV thereon may be rotatable to facilitate the access of a robotic cart assigned with the task of lifting the AV and conveying it to the Capsule.

In the subsequent description it will be assumed that the floors of the Capsule, the Parking Zone, the Passenger Terminal, the Battery zone are all at the same level, which is identical to the Flight deck surface level.

(3.3) A Passenger Terminal

The passenger terminal is positioned fully or partially at flight deck level. In any case there will be embarkation gates at flight deck level(s) but according to convenience some further space might be allocated at lower level(s).

(3.4) A Parking/Maintenance Zone

This zone is preferably positioned at flight-deck level, is communicating with the Vertiport Capsule through a door controlling access of AVs docked to robotic carts or standalone robotic carts move between the Parking Zone and the Capsule. In case that are Flight decks at multiple levels, it is not necessary to have a parking zone at each level, because the parking zone is a buffer for the entire Vertiport which is controlled by the Vertiport central control system. The robotic carts may be also parked at the same parking zone. The AVs may be stowed at the parking zone in a way that will maximize usage of the available space, including possibly folding the supportive arms of the rotors, orienting the rotor blades into preferred angular directions, inclination, staggering. Stowing and parking-facilitating operations may be conducted automatically. For example, robotic carts docked with the AV may climb various inclined surfaces to enable staggering and thereby a more efficient area usage than in the case that all parked vehicles are at the same level.

(3.5) At Least One Battery Charging Zone

This zone is preferably located at flight-deck level or otherwise at lower level(s). The Battery charging zone has a battery outlet accessible by the robotic carts which serve as energy provisioning intermediates between the AV and the battery charging zone. The handling of the batteries within the battery charging zone will be robotic and may assure that the first battery fully replenished within the zone will the first one to be moved to the battery outlet for subsequent pick-up by the energy provisioning robot. Other considerations may be also applied in determining the configuration of the battery system to be supplied by the battery outlet for a specific AV, such as mission planning, number of passengers departing on the flight. The art of battery charging and swapping for electric vehicles is described in U.S. Pat. Nos. 10,144,307, 9,932,019.

It is to be understood that under certain conditions and designs the Battery Charging Zone may be integrated with the Parking Zone, in particular in cases that the AV design features an integral battery which may be charged at the Parking Zone.

(3.6) A Vertiport Control System

Figure 27:
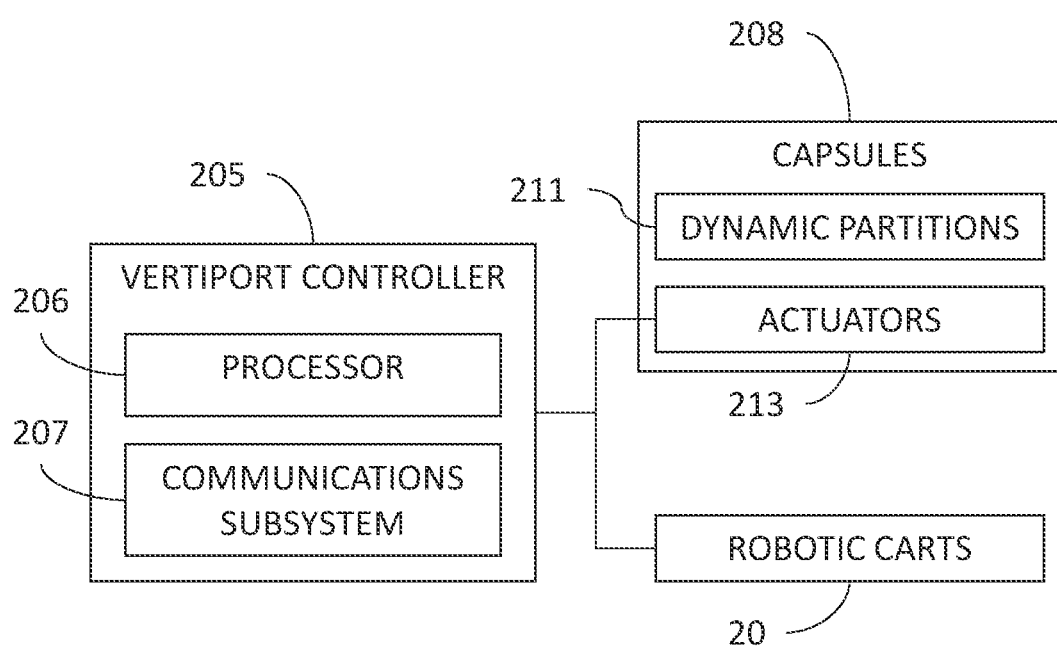
FIG. 27 is a block diagram of a vertiport controller and its associated components.

FIG. 27 illustrates a Vertiport Controller 205, including at least one processor 206 and a communications subsystem 207. The Vertiport Controller is in communication with actuators 213 to actuate the dynamic partition 211 of capsules 208, and with robotic carts 20. This system controls all activities related to the Vertiport, including communication with the Air Traffic Controller (Air Traffic Control Center), allocation of Take-off/Landing pads and control of all the functional cycles at the Vertiport.

The entire handling of the AV at the Vertiport from touch-down to take-off is preferably controlled by a Vertiport central computer. The Vertiport central computer has a secure communications connection to the Central Flight Traffic Control System.

In certain embodiments, the present invention provides a structure and process for effectively supplying these resources at a coordinated timing according to passenger departure schedule.

It is to be noted that if even one of these resources is not timely provided, the flight is delayed. In additional to the passenger dissatisfaction, this also means ineffective utilization of the other resources (that were provided)—for example, when a replenished battery is not provided in a timely manner, a landing pad and an AV which could otherwise been utilized are standing idle.

To achieve a shorter cycle between consecutive take-off from a given landing pad, two Capsules may be allocated for each landing pad, servicing two AVs in parallel with the appropriate staggering between the arrival/departure cycles, i.e., when an AV that has landed leaves the landing pad onto one of the Capsules another AV leaves the second Capsule onto the Landing pad. Nevertheless, a functional module of one landing pad and one Capsule could also work, although with a longer cycle time and a lower traffic throughput. Depending on the area available at the Vertiport, several "single pad, single capsule" or "single pad, double capsule" modules could co-exist at the Vertiport. These several modules may be operating in conjunction with a lesser number (preferably one) of passenger terminals, parking zones and charging zones.

The Vertiport as described in the previous sections is in particularly adapted to rooftops in dense urban areas. Whenever area limitations are less stringent, such as in suburban or rural areas, the Vertiport can be implemented on ground surface level with a functionality as described above.

At least one, but preferably a plurality of Vertistops will be provided at various locations in the urban area which may have various levels of functionality:

(4) A Plurality of Emergency Landing Points

Due to the multiple redundancies at all system levels, the AV will be capable to arrive and land safely at one of the Vertiports or Vertistops even in the case of malfunctioning of one of the systems (such as motors, rotors, battery units, control units). Nevertheless, special emergency landing spots will be designated to enable safe landing of the AV under unexpected circumstances, such as sudden extreme weather conditions.

(5) An Air Traffic Control Center

The Air Traffic Control Center handles the individual travel tasks, including planning detailed travel routes for each task. Such travel routes also include contingency landing routes at predetermined contingency locations in case that there is a need to deviate from the planned route due to reasons such as technical faults, weather, or passenger in-flight special request. All travel routes are loaded through the Vertiport computer system to the Air Vehicle computer system prior to take-off. After take-off, the AV will fly autonomously to its predetermined destination. Autonomously in this context means that no human piloting is necessary and that continuous communication to the flight control system is not necessary. The navigation during the autonomous flight might be achieved through any of, or combination of the techniques of GPS, INS, terrain following (optical, radar) known to the persons familiar in the field of navigation or a combination thereof. The AV is preferably provided with sense-and-avoid systems to enhance safety in case of any disturbance or deviation from the scheduled route of any of the Air Vehicles in the surroundings.

Typically, an AV lands on the landing pad in an essentially arbitrary orientation. This orientation may be affected by the direction of arrival, wind direction, etc. Guiding an empty cart from the capsule to dock to an AV on the landing pad is greatly simplified by orienting the AV on the landing pad turntable onto the direction of exit from the capsule. As a result, the cart approaches the AV in an essentially "head-on" trajectory, i.e., in a trajectory where the longitudinal axes of the two bodies overlap.

A well-known method in the art of guidance is known as Command to Line of Sight (CLOS), as taught for example in U.S. Pat. Nos. 3,598,344 and 9,000,340. According to this method, an object is guided to its target by constantly aligning its velocity vector to the line connecting the object and an aiming point on the target. In the present case, the "object" (embodied by the cart) is guided to the "target" (embodied by the AV on the pad) by directing its velocity to an "aiming point" at center of the AV front (or back). When arriving in an essentially head-on trajectory, the cart can be easily guided under the AV, with a typical accuracy of less than 5 cm from each lift on the cart to its respective socket on the AV. The residual misalignment can be handled by mechanical guidance mechanisms, which are well known in the art of pin and socket connectors.

In such case, the movement of the cart to the AV is essentially linear and all navigation and terminal positioning operations are greatly simplified. The cart carrying the AV may be guided in an essentially straight line from the landing pad to the capsule in a similar manner.

There may be also other means, rather than a rotating turntable on the pad, to orient the AV onto the capsule. For example, the pad surface may be structured to include a plurality of rollers in various directions which may act on the AV skids to affect its azimuthal position or the skids themselves may be provided with small, self-actuated wheels for adjusting the AV azimuthal position.

There is also provided according to the teachings of an embodiment of the present invention, a method for operating a Vertiport for AVs, the method, corresponding to arrivals and departures including the steps as presented in the following flow-charts in FIG. 25 (arrivals) and FIG. 26 (departures). For the sake of conciseness, opening and closing of the various doors are not included as blocks in the flow-charts. As already mentioned, at any point in time, at the most one door may be open to enable the passage of an object (AV, robotic cart, passenger) as per the pertinent step in the flow-chart. The following description refers to a Vertiport with two Capsules (A and B) operating in parallel in conjunction with the same take-off/landing pad at the flight deck.

Figure 25:
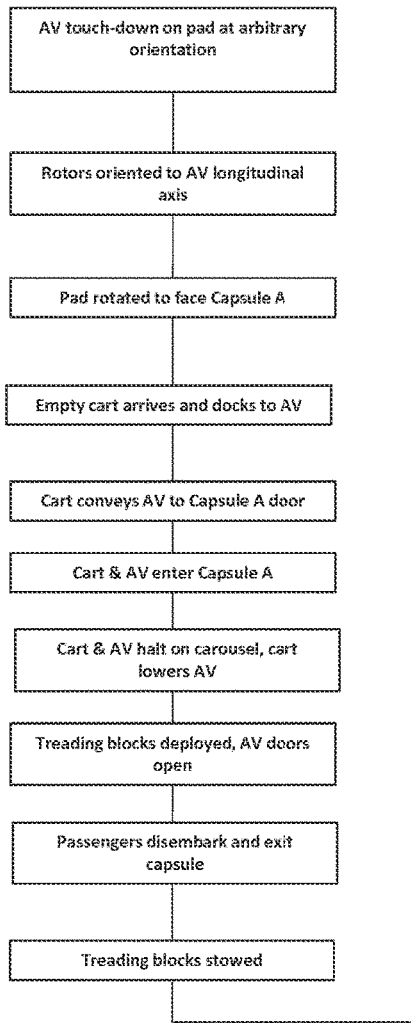
FIG. 25 presents a logical flowchart of the sequence of steps triggered by the landing of an AV.
Figure 25:
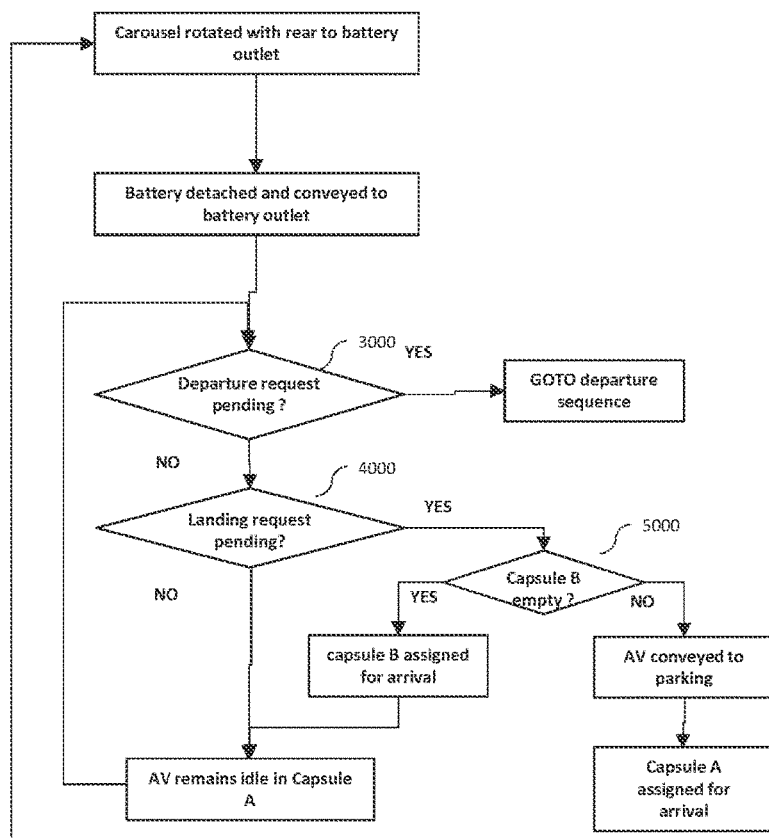

FIG. 25 depicts the flowchart of the Arrivals process at Capsule A, including:
(a) AV touch-down on pad at arbitrary orientation (see also FIGS. 14a,14b)
(b) Rotors oriented to AV longitudinal axis (see also FIG. 14c)
(c) Pad rotated to face Capsule A (see also FIG. 14c)
(d) Empty cart arrives and docks to AV (see also FIGS. 13d, 13e)
(e) Cart conveys AV to Capsule A door (see also FIG. 14f)
(f) Cart docks with AV enter Capsule A (see also FIGS. 15a, 15b)
(g) Cart & AV halt on turntable, cart lowers AV (see also 9a-9c) Treading blocks extended, AV doors open (see also FIGS. 16a,16b)
(h) Passengers disembark and exit capsule (see also FIGS. 16a,16b)
(i) Treading blocks retracted, Turntable rotated with rear to battery outlet (see also FIG. 17a)
(j) Battery detached and conveyed to battery outlet (see also FIGS. 17a, 17b)
(k) At this point there is a logical check at Block 3000 whether there is a departure request pending?
(l) If the outcome of logical check at Block 3000 is YES, then the departure sequence for Capsule A is to be initialized (see further description and also FIG. 25)
(m) If the outcome of logical check at Block 3000 is NO, then there is a logical check at Block 4000 whether there a landing request pending?
(n) If the outcome of logical check at Block 4000 is NO, then proceed to step (s) (AV remains idle in Capsule A pending periodic check according to Block 3000)
(o) If the outcome of logical check at Block 4000 is YES, then there is a logical check at Block 5000 whether Capsule B is empty?
(p) If the outcome of logical check at Block 5000 is NO, then AV is conveyed to parking (see also FIGS. 22a-22d)
(q) Capsule A assigned for arrival
(r) If the outcome of logical check at Block 5000 is YES, then Capsule B is assigned for arrival
(s) AV remains idle in Capsule A pending periodic check according to Block 3000.

Figure 26:
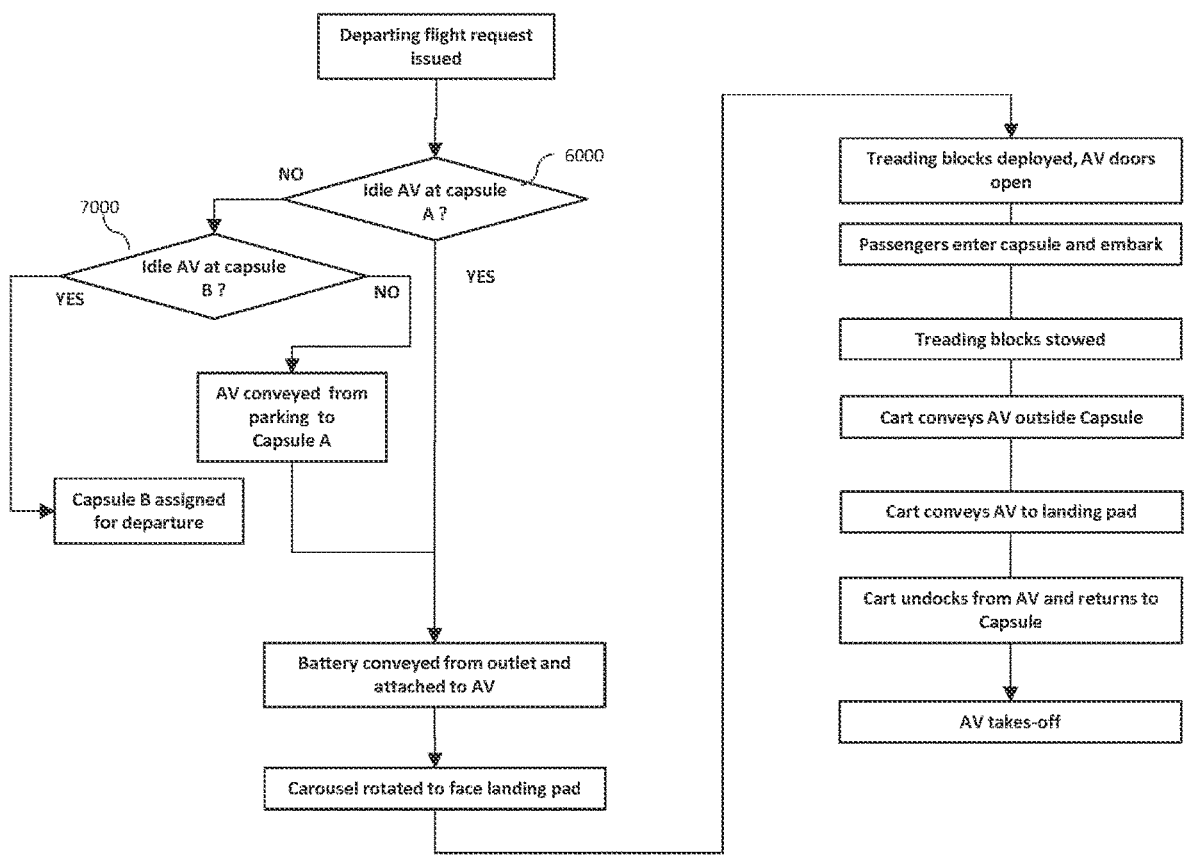
FIG. 26 presents a logical flowchart of the sequence of steps triggered by an issuance of a departure request.

FIG. 26 depicts the flowchart of the Departures process at Capsule A, including:
(a) A departing flight request is issued
(b) At this point there is a logical check at Block 6000 whether there is an idle AV at capsule A
(c) If the outcome of logical check at Block 6000 is YES, then proceed to step (g)
(d) If the outcome of logical check at Block 6000 is NO there is a logical check at Block 7000 whether there is an idle AV at capsule B
(e) If the outcome of logical check at Block 7000 is YES then Capsule B assigned for departure
(f) If the outcome of logical check at Block 7000 is NO, an AV is conveyed from parking to Capsule A (see also FIGS. 23a-23c)
(g) Battery conveyed from outlet and attached to AV (FIGS. 18a, 18b)
(h) Turntable rotated to face landing pad
(i) Treading blocks deployed, AV doors open (see also FIG. 16b)
(j) Passengers enter capsule and embark (see also FIG. 19a,
(k) Treading blocks stowed
(l) Cart conveys AV outside Capsule (see also FIGS. 20a, 20b)
(m) Cart conveys AV to landing pad (see also FIG. 21a)
(n) Cart undocks from AV and returns to Capsule (see also FIGS. 21b, 21c)
(o) AV takes-off (see also FIGS. 21d,21e)

It is noted that within the scope of the present invention, other options may exist for robotic battery swapping, such as conveying batteries to and from the battery outlet onto a submerged location at the capsule center by a belt-type system and performing the swapping operation by a robotic system installed at the Capsule center instead by the robotic cart. This type of solution may entail more complexity and investment related to the Capsule. A turntable at the capsule floor may not be feasible in such a case, in which case the robotic cart automotive means would be used for horizontal rotation of the AV onto the direction of the door facing Parking Zone. All other teaching as regarding the Vertiport design are unchanged.

A further design option involves a different structure and functionality of the robotic cart. Rather than an integrated robotic cart as depicted in FIG. 3, two separate robotic carts are provided, one for lifting and conveying the AV (to be hereinafter referred to as the AV conveying cart) and the other one for energy provisioning (to be hereinafter referred to as battery swapping cart). The battery swapping cart is configured to position itself within the constraints of the AV conveying cart (entering from behind). With such design configuration, the limitation in the height of the battery swapping cart is no more determined by the height of the lower surface of the battery attached to the AV. In the process of battery swapping, the AV may be lifted by the AV conveying cart or by lifting actuators emerging from the capsule floor to a height that will enable the battery swapping cart to enter the space within the confines of the AV conveying cart and the battery lower surface and to align itself with the battery. The design of the battery swapping cart may be even more convenient in the case that the AV conveying cart departs from the AV onto the parking zone at the beginning of the swapping process. In such case the AV may be lifted to the desired height by lifting actuators emerging from the capsule floor and the battery swapping cart would enter the space below the elevated AV to align itself with the battery. Under such conditions, the battery may be lowered onto the battery swapping cart by the action of the same actuators that had previously lifted the AV or by dedicated lifting actuators of the battery swapping cart.

In the case of an AV design with integrated battery, there will be no battery swapping and the AV batteries will be charged by connecting the AV to battery charging points preferably at the Battery Charging Zone. The battery charging points need to be spaced in a way to allow AV access to each of them. In this case the robotic cart may convey the AV to the Battery Charging Zone. Rather than having a battery outlet as described for the design based on swapping, the entire AV has to be conveyed to the Battery charging zone for charging and the door of the capsule facing the battery charging zone must be of a size that will enable such passage. There might be a battery charging point in the capsule itself, to which the robotic cart may connect the AV and thereby facilitate energy provisioning, but such solution does not enable any buffer and also entails the disadvantage of keeping the capsule unnecessarily occupied, thus preventing access by an AV from an incoming flight.

Having described the various elements of a Vertiport, we note its passenger-centric functionality: for a flight to depart three resources must be provided: an AV, a replenished battery, a landing pad.

Each resource is the product of a distinct process:
(a) Arrival at capsule of replenished battery from a battery outlet.
(b) Arrival at capsule of an AV—either one that has just landed or one from parking.
(c) Availability of landing pad according to Vertiport arrivals and departures scheduling.

It is to be noted that if even one of these resources is not timely supplied, an outgoing flight is delayed. Additional to the passenger dissatisfaction, this would also mean ineffective utilization of the other resources. for example, when a battery is not supplied in a timely manner, a landing pad and an AV which could otherwise been used are standing idle. The streamlined operation of the Vertiport as per the invention eliminates such mismatch.

To summarize, an ultra-compact and highly efficient Vertiport is achieved by:
(1) An AV having a detachable battery located at its bottom.
(2) An autonomous robotic cart configured for docking to the AV and conveying it between landing pad, embarkation zone and parking zone.
(3) An isolated boarding enclosure located in close proximity of e.g., 10-20 meters from the landing pad it serves.
(4) A battery swapping device capable of performing a rapid battery replacement procedure. This device preferably performs the battery replacement within the embarkation enclosure (Capsule). Preferably, this device is integrated within the robotic cart configured for conveying the AV.
(5) A parking zone capable of accommodating a multitude of AV's, for managing the imbalance between take-offs and landings.

The teachings of the invention are applicable for VTOL aircraft other than pure-multi-copters as well.

Embodiment B

A second embodiment of the present invention is presented in FIGS. 24a-24d. This embodiment differs from the first embodiment in the geometry of the capsule doors. Whereas in the first embodiment four different doors are used to regulate the flow of passengers, AV's, carts and batteries, in the present embodiment the capsule employs merely two circular doors for the same purpose.

An outer door 242 spans a circular arc slightly larger than 180 degrees (e.g., 200 degrees) and is rotatable by 360 degrees. An inner door 240, also spanning a circular arc of slightly more than 180 degrees (e.g., 200 degrees) but of a radius slightly smaller than that of the outer one, is also rotatable by 360 degrees. By rotating these two doors, an opening of any size in the range 0-160 degrees can be formed, at any desired direction. Rotating these doors controls the flow of passengers, AV's, carts and batteries to-and-fro the capsule.

Figure 24A:
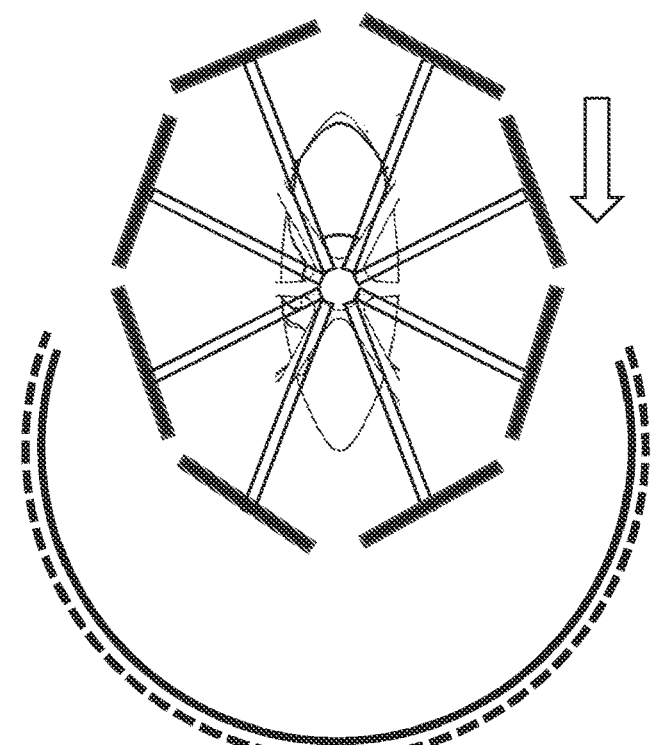
FIGS. 24a-24d present top views of the capsule with the AV in different positions according to a second embodiment of the present invention.
Figure 24B:
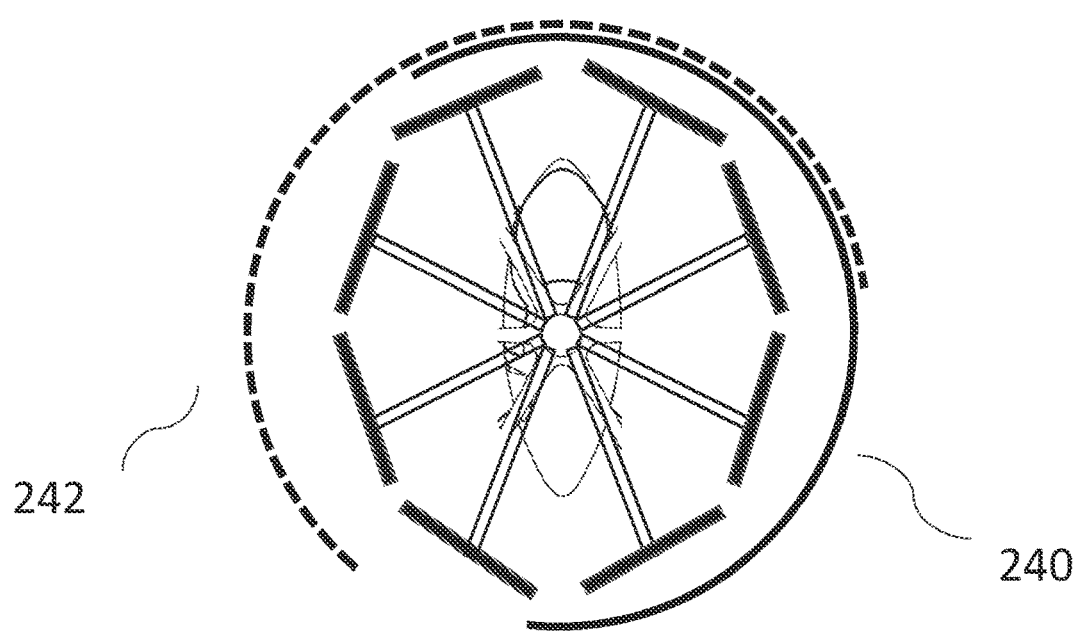
Figure 24C:
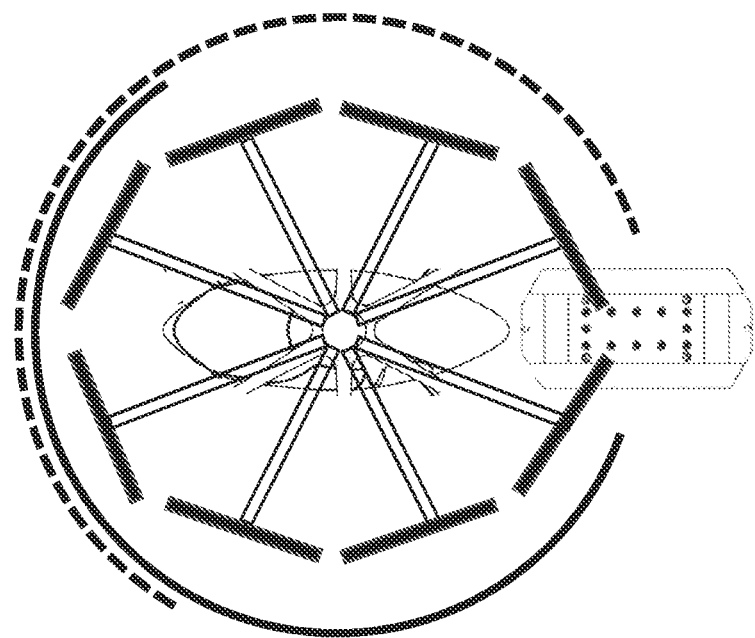
Figure 24D:
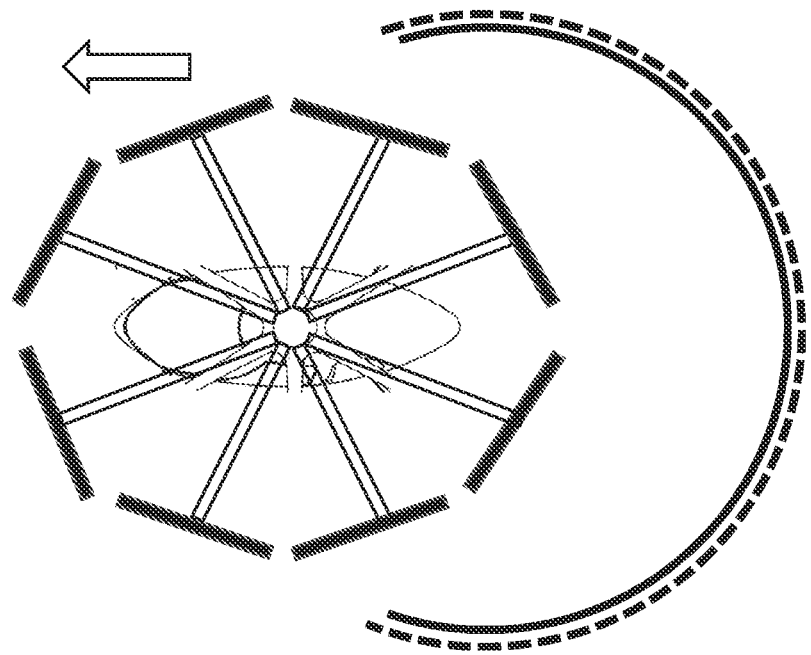

FIG. 24a presents an AV docked on a cart entering the capsule according to the present embodiment, corresponding to FIGS. 15a-15b presenting the same position according to the first embodiment. FIG. 24b presents the stage of passenger dis-embarkment according to the present embodiment, corresponding to FIGS. 16a-16b presenting the same position according to the first embodiment. FIG. 24c the AV with its rear towards the battery outlet and a cart conveying a battery to the battery outlet according to the present embodiment, corresponding to FIG. 17b presenting the same position according to the first embodiment. FIG. 24d presents an AV docked on a cart exiting the capsule to the Parking Zone according to the present embodiment, corresponding to FIG. 22d presenting the same position according to the first embodiment.

As can be seen, this unique door scheme allows, for a given AV, implementing a capsule only slightly larger than the AV's footprint. The 4-door implementation of the first embodiment would not allow using such a relatively compact capsule. The reason is that in this case many different doors would have to overlap, which would require using three or more layers of different radii which make the solution impractical.

Embodiment C

In a third embodiment presented, an AV is designed to carry up to two passengers seated side by side in the cabin. However, it is expected that in many cases the AV will fly with only one passenger. However, single-passenger occupancy and two-passenger occupancy of the AV entail a considerably different payload weight and a different center of gravity. The payload weight allocation for a passenger including luggage is for example 100 kg and the lateral shift of the payload center of gravity in the one-passenger case is for example 0.5 meter.

One attractive method for extending the range, in case of one-passenger occupancy, is by extending the energy store capacity (for example battery capacity) with a corresponding increase in the energy store weight in lieu of a second passenger. In such case, preferably, but not necessarily the weight distribution of the energy store will take into account center-of-gravity considerations. Thereby, the changes relatively to the weight and center-of-gravity characteristics may be mitigated and the control system characteristics may be minimally affected.

According to the above considerations, the Vertiport may preferably offer different flight configurations for single-passenger or for two-passenger occupancy, using a common AV design but with a different battery type. All types of batteries will preferably have the same interface with the AV as well as with the robotic carts and the battery outlet.

The flight fares may be adjusted according to various factors taking in account for example range, payload weight, time in the day and week, priorities. As a matter of fine-tuning and offering the passengers a wider choice of more than two energy store options may be offered.

Being able to adjust the energy store to be provided to a given AV according to mission parameters such as number of passengers, payload weight, destination range is a major advantage of energy store swapping. Energy store swapping can be conveniently performed by robotic carts.

It should be noted that the various embodiments and implementations of the invention described herein are not mutually exclusive, and that features described in the context of one implementation may be combined with any and all features of another implementation, all as will be clear to a person ordinarily skilled in the art.

It will be appreciated that the above descriptions are intended only to serve as examples, and that many other embodiments are possible within the scope of the present invention as defined in the appended claims.

The design as described above involves both minimum distance and minimum time for passenger travelling from take-off/landing pad to terminal gate and vice-versa. It also provides for very safe and convenient embarkation on both sides of the AV. The design also obviates moving the AV for any purpose from floor-to-floor. As explained, according to the current invention short-term parking, which is time critical as being provided for handling momentary traffic imbalances, is to be in the immediate vicinity of the capsule. As for long-term parking, which is not time critical, one may provide additional parking spaces at a lower level. For that purpose, no elevators or conveyor belts are necessary, as the robotic cart docked with the AV is a self-sufficient means of conveying the AV's between floors via ramps if so desired.

It will be appreciated that the above descriptions are intended only to serve as examples, and that many other embodiments are possible within the scope of the present invention as defined in the appended claims.

What is claimed is:

1. A vertiport for use in a transportation system transporting passengers via a fleet of passenger-conveying VTOL air vehicles (AVs), the vertiport comprising:
   (a) a flight deck including at least one landing pad;
   (b) a passenger terminal;
   (c) at least one disembarkation area for at least one passenger to disembark from the AV for entering said passenger terminal;
   (d) a robotic system comprising at least one handling robot configured for automatically approaching and docking with an AV while not in flight, wherein said at least one handling robot is operative to convey the AV within the vertiport;
   (e) at least two turntables for orienting a stand-alone AV or an AV docked with said at least one handling robot; and
   (f) a vertiport controller comprising at least one processor and at least one communications subsystem, said vertiport controller controlling the movement of the AV, handling robot and turntables at the vertiport,
   wherein a first of said at least two turntables is positioned on said landing pad, and wherein said vertiport controller is operable to orient said AV, after landing on said first of said turntables, to be aligned with a direction to a second of said turntables at said disembarkation area.

2. The system of claim 1, wherein said at least two turntables are implemented as at least three turntables, and wherein said vertiport controller is configured to select a target turntable selected from the group consisting of said second turntable and said third turntable, and to actuate said first turntable to selectively orient said AV to be aligned with a direction to said target turntable.

3. A vertiport for use in a transportation system transporting passengers via a fleet of passenger-conveying VTOL air vehicles (AVs), the vertiport comprising:
   (a) a flight deck including at least one landing pad;
   (b) a passenger terminal;
   (c) at least one disembarkation area for at least one passenger to disembark from the AV for entering said passenger terminal;
   (d) a robotic system comprising at least one handling robot configured for automatically approaching and docking with an AV while not in flight, wherein said at least one handling robot is operative to convey the AV within the vertiport;
   (e) at least two turntables for orienting a stand-alone AV or an AV docked with said at least one handling robot;
   (f) a vertiport controller comprising at least one processor and at least one communications subsystem, said vertiport controller controlling the movement of the AV, handling robot and turntables at the vertiport; and
   (g) an energy replenishing facility,
   wherein a first of said at least two turntables is positioned at said disembarkation area, and wherein said vertiport controller is configured to actuate said first turntable, when said AV is positioned on said first turntable, to selectively orient said AV so as to be aligned either with a second of said turntables or with said energy replenishing facility.

4. A vertiport for use in a transportation system transporting passengers via a fleet of passenger-conveying VTOL air vehicles (AVs), the vertiport comprising:
- (a) a flight deck including at least one landing pad;
- (b) a passenger terminal;
- (c) at least one disembarkation area for at least one passenger to disembark from the AV for entering said passenger terminal;
- (d) a robotic system comprising at least one handling robot configured for automatically approaching and docking with an AV while not in flight, wherein said at least one handling robot is operative to convey the AV within the vertiport;
- (e) at least one turntable for orienting a stand-alone AV or an AV docked with said at least one handling robot; and
- (f) a vertiport controller comprising at least one processor and at least one communications subsystem, said vertiport controller controlling the movement of the AV, handling robot and turntable at the vertiport, wherein said turntable is positioned on said landing pad, and wherein said vertiport controller is operable to orient said AV, after landing on said turntable, to be aligned with a direction to said disembarkation area.

* * * * *